US012745330B2

(12) United States Patent
Choi et al.

(10) Patent No.: US 12,745,330 B2
(45) Date of Patent: Sep. 22, 2026

(54) GROUP-PERFORMANCE CONTROL METHOD USING LIGHT-EMITTING DEVICES

(71) Applicant: FANLIGHT CO., LTD., Uiwang-si (KR)

(72) Inventors: Kyung Il Choi, Seoul (KR); Jung Min Choi, Seoul (KR)

(73) Assignee: FANLIGHT CO., LTD., Uiwang-si (KR)

( * ) Notice: Subject to any disclaimer, the term of this patent is extended or adjusted under 35 U.S.C. 154(b) by 65 days.

(21) Appl. No.: 18/937,227

(22) Filed: Nov. 5, 2024

(65) Prior Publication Data

US 2025/0098045 A1 Mar. 20, 2025

Related U.S. Application Data

(63) Continuation of application No. 18/179,278, filed on Mar. 6, 2023, now abandoned, which is a
(Continued)

(30) Foreign Application Priority Data

Jun. 25, 2018 (KR) ........................ 10-2018-0072860

(51) Int. Cl.
*H05B 45/20* (2020.01)
*G09F 19/22* (2006.01)
(Continued)

(52) U.S. Cl.
CPC ............. *H05B 45/20* (2020.01); *G09F 19/22* (2013.01); *H05B 47/155* (2020.01); *H05B 47/19* (2020.01);
(Continued)

(58) Field of Classification Search
CPC ...... H05B 47/155; H05B 47/19; H05B 45/20; H05B 47/165; H05B 47/1965;
(Continued)

(56) References Cited

U.S. PATENT DOCUMENTS 10,104,747 B1 10/2018 Wein
2003/0017823 A1 1/2003 Mager et al.
(Continued)

FOREIGN PATENT DOCUMENTS

EP 3211971 A1 8/2017
JP 2003-036981 A 2/2003
(Continued)

OTHER PUBLICATIONS

An Office Action mailed by China National Intellectual Property Administration on Aug. 14, 2023, which corresponds to Chinese Patent Application No. 202111366884.9 and is related to U.S. Appl. No. 18/179,278.
(Continued)

*Primary Examiner* — Monica C King
(74) *Attorney, Agent, or Firm* — Dinsmore & Shohl LLP

(57) ABSTRACT

Disclosed is a method for controlling a plurality of light-emitting devices. The method includes at least: inputting group information into a respective light-emitting device, the group information to be inputted corresponds to a seat in a venue, on which the respective light emitting device to be positioned; and selectively controlling illuminating or extinguishing of groups of light-emitting devices, in accordance with the group information, to present an image over the plurality of light-emitting devices positioned on seats in the venue of an event during a particular period of a group-performance presentation.

8 Claims, 17 Drawing Sheets

Related U.S. Application Data continuation of application No. 17/108,352, filed on Dec. 1, 2020, now Pat. No. 11,638,338, which is a continuation of application No. 16/424,219, filed on May 28, 2019, now Pat. No. 10,893,597, which is a continuation of application No. PCT/KR2018/014929, filed on Nov. 29, 2018.

(51) Int. Cl.
*H05B 47/155* (2020.01)
*H05B 47/175* (2020.01)
*H05B 47/19* (2020.01)
*H05B 47/195* (2020.01)

(52) U.S. Cl.
CPC ....... *H05B 47/1985* (2024.01); *H05B 47/195* (2020.01); *H05B 47/1965* (2024.01)

(58) Field of Classification Search
CPC ........ H05B 47/10; H05B 47/16; H05B 47/12; H05B 47/1985; H05B 45/10; H05B 45/22; H05B 45/325; H05B 45/37; H05B 47/11; H05B 47/175; H05B 47/197; H05B 47/198; H05B 45/18; H05B 47/105; H05B 45/00; H05B 45/56; H05B 47/115; H05B 47/185; H05B 47/196; H05B 47/1975; H05B 6/6444; G09F 3/0297; G09F 2023/005; G09F 9/30; G03B 15/05; G03B 2215/0521; G03B 2215/0535; G03B 2215/0567; G03B 2215/0592; G06F 3/1423; G06F 3/04847; G06F 3/0488; G06F 3/1446
See application file for complete search history.

(56) References Cited

U.S. PATENT DOCUMENTS

| | | | | |
|---|---|---|---|---|
| 2010/0195623 | A1 | 8/2010 | Narasimhan et al. | |
| 2012/0162971 | A1 | 6/2012 | Wein | |
| 2013/0109304 | A1 | 5/2013 | Marcu et al. | |
| 2014/0184386 | A1 | 7/2014 | Regler et al. | |
| 2014/0185285 | A1 | 7/2014 | Jorgensen | |
| 2014/0237043 | A1 | 8/2014 | Walsh et al. | |
| 2015/0012308 | A1 | 1/2015 | Snyder | |
| 2015/0089539 | A1 | 3/2015 | Davis | |
| 2015/0156745 | A1 | 6/2015 | Shcheglov et al. | |
| 2015/0256762 | A1 | 9/2015 | King | |
| 2015/0287119 | A1 | 10/2015 | Bhan et al. | |
| 2017/0026666 | A1 | 1/2017 | Bhatt et al. | |
| 2017/0249489 | A1* | 8/2017 | Lee | H04W 4/80 |
| 2019/0325181 | A1 | 10/2019 | Lee et al. | |
| 2020/0117865 | A1 | 4/2020 | Lee et al. | |
| 2020/0342191 | A1 | 10/2020 | Lee et al. | |

FOREIGN PATENT DOCUMENTS

| | | | |
|---|---|---|---|
| JP | 2005-251443 | A | 9/2005 |
| JP | 2014-529844 | A | 11/2014 |
| JP | 2017-157549 | A | 9/2017 |
| KR | 10-1431228 | B1 | 8/2014 |
| KR | 10-2015-0009405 | A | 1/2015 |
| KR | 10-2015-0055938 | A | 5/2015 |
| KR | 10-2016-0015032 | A | 2/2016 |
| KR | 10-2017-0101485 | A | 9/2017 |
| KR | 10-2017-0106105 | A | 9/2017 |
| KR | 10-2017-0142155 | A | 12/2017 |
| KR | 10-2018-0015700 | A | 2/2018 |
| KR | 10-2018-0015702 | A | 2/2018 |
| WO | 2016/108287 | A1 | 7/2016 |

OTHER PUBLICATIONS

An Office Action mailed by China National Intellectual Property Administration on Jan. 16, 2024, which corresponds to Chinese Patent Application No. 202111366884.9 and is related to U.S. Appl. No. 18/179,278.

The extended European search report issued by the European Patent Office on Jun. 9, 2022, which corresponds to European Patent Application No. 18924054.2-1201 and is related to U.S. Appl. No. 18/179,278.

An Office Action mailed by the Japanese Patent Office on May 10, 2020, which corresponds to Japanese Design Application No. 2019-048528 with English translation.

An Office Action mailed by the Korean Patent Office on Apr. 1, 2020, which corresponds to Korean Patent Application No. 10-2019-003645 with English Translation.

International Search Report issued in PCT/KR2018/014929; mailed Mar. 22, 2019.

An Office Action; "Notice of Reasons for Refusal," mailed by the Japanese Patent Office on Dec. 20, 2022, which corresponds to Japanese Patent Application No. 2022-073326 and is related to U.S. Appl. No. 17/108,352.

* cited by examiner

GROUP-PERFORMANCE CONTROL METHOD USING LIGHT-EMITTING DEVICES

CROSS-REFERENCE TO RELATED APPLICATIONS

The present application is a continuation of U.S. patent application Ser. No. 18/179,278, filed on Mar. 6, 2023, which is a continuation of U.S. patent application Ser. No. 17/108,352, filed on Dec. 1, 2020, which is a continuation of U.S. patent application Ser. No. 16/424,219, filed on May 28, 2019, which is a continuation of International Patent Application No. PCT/KR2018/014929, filed on Nov. 29, 2018, which is based upon and claims the benefit of priority to Korean Patent Application No. 10-2018-0072860 filed on Jun. 25, 2018. The disclosures of the above-listed applications are hereby incorporated by reference herein in their entirety.

RELATED ART

Embodiments of the inventive concept described herein relate to a method for controlling light-emitting devices for group-performance and a group-performance presentation system using the same.

In general, an illumination device refers to a light-emission device that reflects, refracts, and transmits light from a light source to achieve a purpose of illumination. The illumination device may be classified into an indirect illumination device, an semi-indirect illumination device, a general diffusion device, a semi-direct illumination device, and a direct illumination device depending on light distribution.

Due to technological improvements, illumination devices have been used for a variety of purposes. For example, the illumination devices are used to present a media facade. The media facade refers to implementing a media function by installing the illumination devices on an outer wall of a building.

In another example, the illumination devices may be used as small cheering devices at an event, such as a sports game or a concert, held with an environment having a certain low illuminance. However, in such an environment, there are problems that it is difficult to create a systematic illumination pattern or shape because each illumination device is individually controlled by each audience. Further, there are other problems that only using a light source positioned in the illumination device may not lead to a satisfactory cheering effect.

Accordingly, in order to solve the above problems, it is required to introduce a variety of group-performance presentations in events held at venues such as sports stadiums or concert halls by collectively controlling a plurality of illumination devices.

SUMMARY

Embodiments of the inventive concept provide a method for controlling light-emitting devices to provide group-performance presentations in sports games or concert events held at venues such as sports stadiums or concert halls, and a group-performance presentation system using the same.

Further, embodiments of the inventive concept provide a method and device for grouping light-emitting devices and for controlling the light-emitting devices on a group basis.

The purposes to be achieved by the present disclosure are not limited to those mentioned above. Other purposes as not mentioned may be clearly understood by a person of ordinary skill in the art from descriptions below. According to some embodiments, the present disclosure provides a method including inputting group information into a respective light-emitting device, the group information to be inputted corresponds to a seat in a venue, on which the respective light emitting device to be positioned, and selectively controlling illuminating or extinguishing of groups of light-emitting devices, in accordance with the group information, to present an image over the plurality of light-emitting devices positioned on seats in the venue of an event during a particular period of a group-performance presentation.

According to some other embodiments, the present disclosure provides a method including generating, during an event, group-performance presentation mapping data including information on mapping between a group and a color configured to be emitted by light-emitting devices belonging to the group during a particular period of a group-performance presentation, wirelessly broadcasting the generated mapping data across a venue of the event, and selectively controlling illuminating or extinguishing of groups of light-emitting devices, in accordance with the mapping data, to present an image over the plurality of light-emitting devices positioned on seats in the venue of the event during the particular period of the group-performance presentation.

According to yet other embodiments, the present disclosure provides a method including acquiring boundary information of each group of light-emitting devices in each scene of a group performance presentation, generating, based on the acquired boundary information, information for grouping the plurality of light-emitting devices, each of which is mapped to a respective seat in a venue of an event, generating group identifications to be assigned to the plurality of light-emitting devices, light-emitting devices included in the same group are configured to be assigned the same group identification, and generating group information that includes the generated information for grouping the plurality of light-emitting devices and the generated group identification.

BRIEF DESCRIPTION OF DRAWINGS

The above and other objects and features will become apparent from the following description with reference to the following figures, wherein like reference numerals refer to like parts throughout the various figures unless otherwise specified, and wherein.

DETAILED DESCRIPTION

Figure 1:
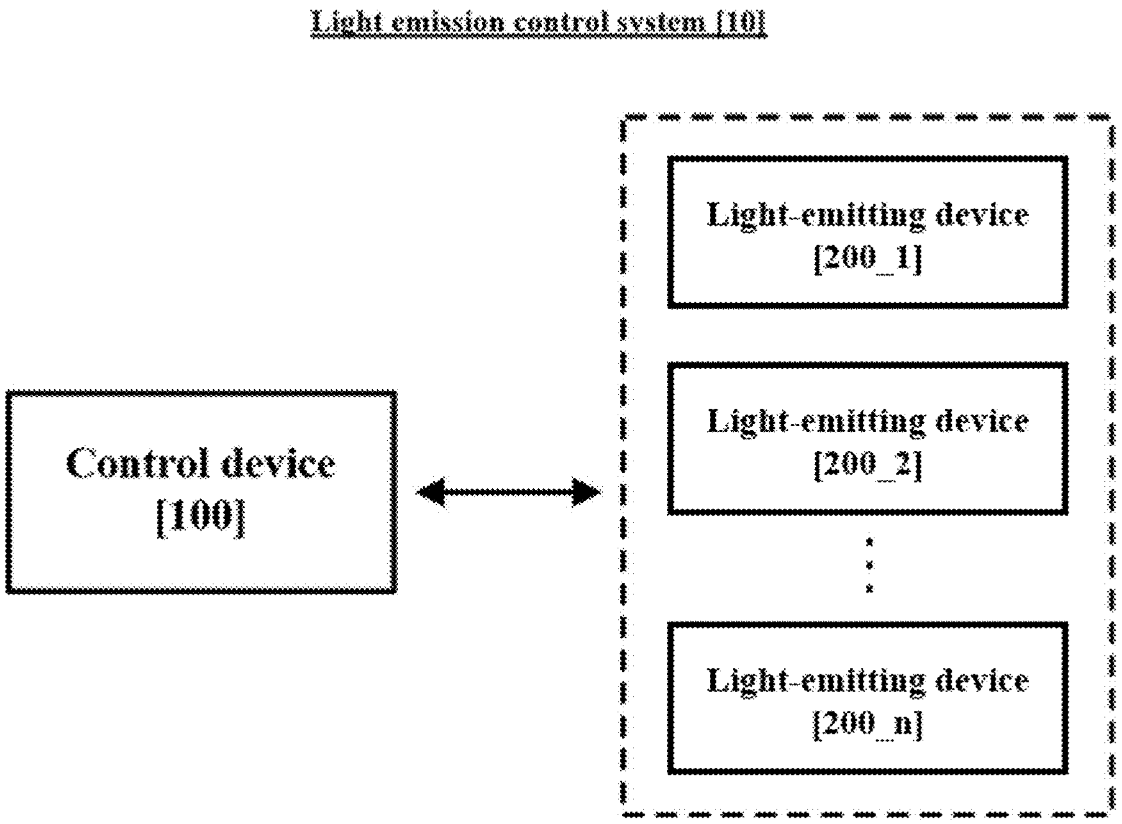
FIG. 1 is a schematic diagram showing a configuration of a light-emission control system for a group-performance presentation according to some embodiments of the present disclosure.

Advantages and features of the present disclosure, and methods for accomplishing the advantages and features will become apparent with reference to embodiments described in detail below with reference to the accompanying drawings. However, the present disclosure is not limited to the embodiments disclosed below, but may be embodied in many different forms. These embodiments are provided so that understanding of the present disclosure is complete and that the present disclosure fully illustrates a scope of the present disclosure to the ordinary artisan of the art to which the present disclosure pertains. A scope of the present disclosure is only defined by a scope of the claim.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list. It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Further, hereinafter, terms "seat" and "seats" are used for referring to spectator or audience seat or seats in a venue according to some embodiments of the present disclosure. The term "venue" is used for referring to a sports venue (e.g., sports stadium) or a performance venue (e.g., concert hall), according to some embodiments of the present disclosure. The terms "light-emitting device" and "light-emitting devices" are used for describing a cheering light-emitting device and cheering light-emitting devices according to some embodiments of the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made in detail to embodiments of the present disclosure, examples of which are illustrated in the accompanying drawings.

FIG. 1 is a schematic diagram showing a configuration of a light-emission control system for a group-performance presentation according to some embodiments of the present disclosure.

Referring to FIG. 1, in some embodiments, a light-emission control system 10 includes a control device 100 and a collection of control light-emitting devices 200_1, 200_2, . . . , and **200_*n* (hereinafter, collectively 200). In this light-emission control system 10, the control device 100 controls light-emission states of the light-emitting devices 200, such that the light-emitting devices 200** produces various types of light-emission patterns for a group-performance presentation such as a cheering performance, on seats in a venue.

In some embodiments, the control device 100 controls the light-emitting devices 200 for group-performance presentation in a venue. In some embodiments, the control device 100 is an electronic device such as a smart phone, tablet, desktop PC, laptop PC, netbook computer, or the like, or is configured in various other feasible forms. In some alternative embodiments, the control device 100 is configured in various forms, including a form in which the device 100 includes some of components of such an electronic device or a form in which the device 100 interfaces with such components.

In some embodiments, the light-emitting device 200 produces various types of light-emission patterns in real time or according to predetermined control information under control of the control device 100. In some embodiments, the light-emitting device 200 includes a light source and is a miniature cheering tool used in a venue, such as sports stadiums or concert halls.

In some embodiments, the control device 100 and the light-emitting devices 200 communicate with each other in various ways and are connected to each other via wireless communication, such as, for example, RF communications, Wi-Fi communication, a cellular communication or electronic tags.

Figure 2:
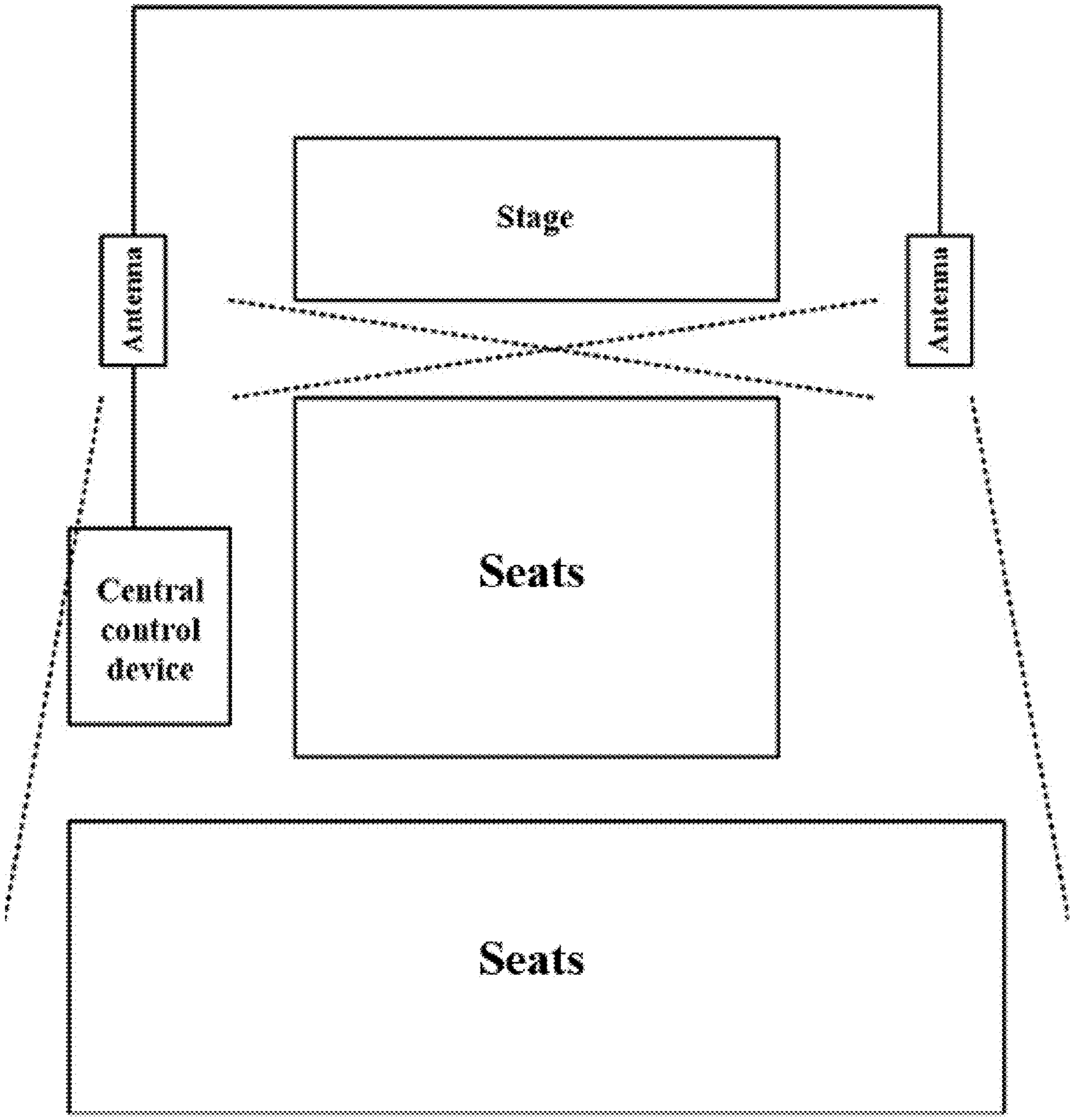
FIG. 2 is a schematic view of a venue to hold an event to which a light-emission control system according to some embodiments of the present disclosure is applied.

FIG. 2 is a schematic representation of a venue to hold an event to which a light-emission control system according to some embodiments of the present disclosure is applied.

Referring to FIG. 2, in some embodiments, a venue is a sports or performance venue for performing sports events or concert performances. The venue according to some embodiments is composed of, for example, a stage or a playground, spectator or audience seats, or the like. Further, venues according to some embodiments are equipped with various devices required for the performance, such as audio devices and illumination devices. In some embodiments, a central control device including a control console for coordinating and controlling operations of such devices is provided in the venue.

The light-emission control system 10 incorporating the control device 100 and the light-emitting devices 200 according to some embodiments of the present disclosure is applied to a venue as shown in FIG. 2. In some embodiments, the control device 100 is located within a venue to control the light-emitting devices 200. In some embodiments, the light-emitting devices 200 is positioned on seats to produce various light-emission patterns under the control of the control device 100. In these embodiments, the light-emitting devices 200 are arranged in a corresponding manner to seats based on a seats layout.

Further, in some embodiments, the control device 100 operates in conjunction with the central control device (refer to FIG. 2). In some embodiments, the control device 100 is included in the central control device. Further, in some embodiments, the control device 100 receives a signal from the central control device and operates in synchronization with the audio device, the illumination device, etc., in the venue. This allows synchronizing the light-emitting devices 200 with the audio device and the illumination device to automatically produce the performance.

Figure 3:
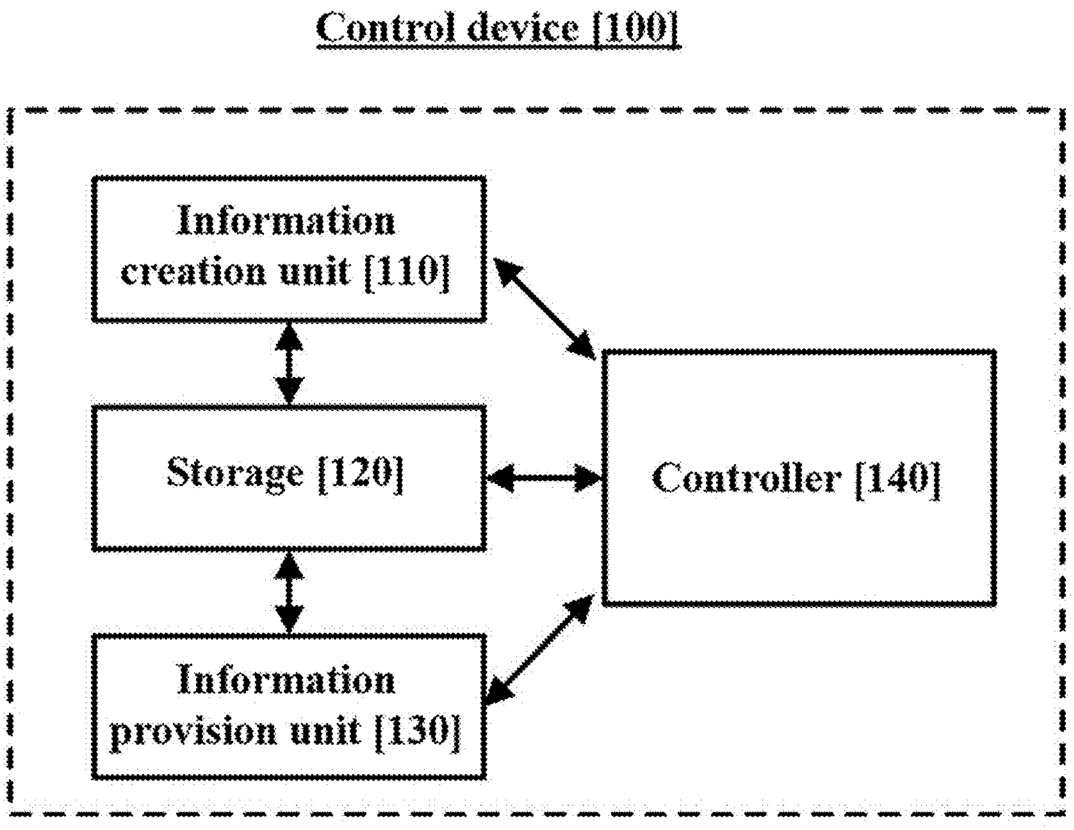
FIG. 3 is a schematic diagram showing a configuration of a control device according to some embodiments of the present disclosure.

FIG. 3 a schematic diagram showing a configuration of a control device according to some embodiments of the present disclosure.

Referring to FIG. 3, the control device 100 according to some embodiments of the present disclosure includes an information creation module 110, storage 120, an information provision module 130, and a controller 140.

Figure 16:
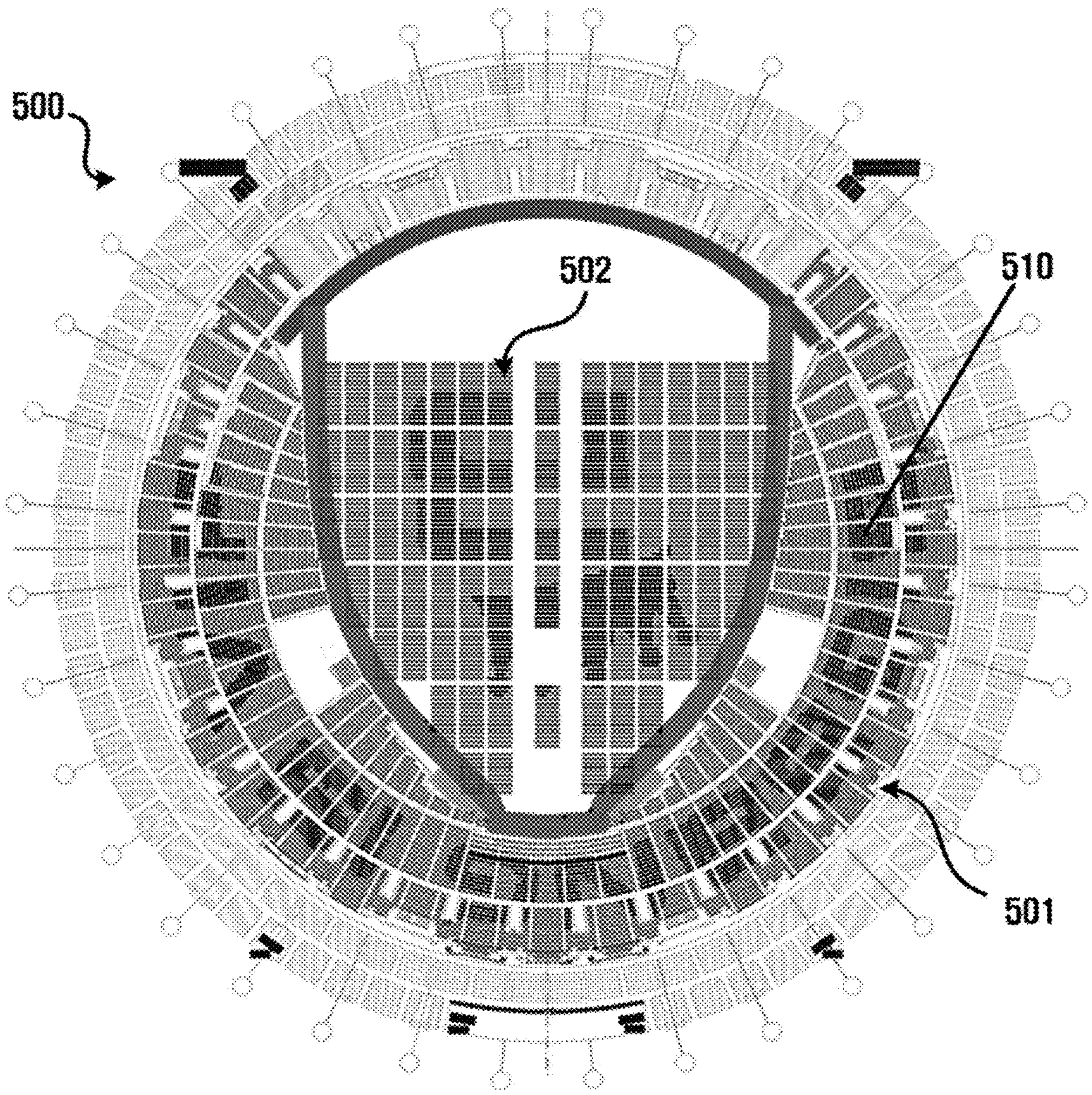
FIG. 16 is an illustration of a group-performance scene presented on seats according to some embodiments of the present disclosure.

In some embodiments, the information creation module 110 creates a group-performance scene to be presented by using the light-emitting devices 200 during performance time in a venue. In some embodiments, the performance time is sports play or arts performance time, and the venue is a sports venue or an art performance venue. In these embodiments, a corresponding group-performance scene is configured for a corresponding group-performance presentation period in an entire group-performance scene. For example, in a first group-performance presentation period, for example, at a first time, a first group-performance scene, for example, a first scene is created. Then, a second group-performance scene (e.g., a second scene) is created in a second group-performance presentation period (e.g., second time). When the seats in the venue are configured as shown in FIG. 16, in the first group-performance presentation period, the first group-performance scene is created that is composed as a specific text (e.g., "BIGBANG IS VIP") as in FIG. 16. In the second group-performance presentation period, a scene that is different from the first group-performance scene, as the second group-performance scene as presented by a specific shape and pattern presented in middle-area seats in FIG. 16 is created.

In some embodiments, the information creation module 110 groups the seats in the venue into a plurality of groups based on each group-performance scene created for each group-performance presentation period. In some embodiments, the module 110 generates group information on the plurality of groups. For example, when a plurality of groups is grouped to realize a light emission pattern that presents the first group-performance scene to be presented in the first group-performance presentation period, the module 110 divides the seats in the venue into a plurality of regions corresponding to the number of groups, and defines each divided region as each group. In other words, in some embodiments, the first group-performance scene corresponding to the first group-performance presentation period includes a plurality of groups.

In some embodiments, the information creation module 110 maps the group information generated for each group-performance presentation period (each group-performance constituting scene). The module 110 configures the mapped group information as group-performance presentation mapping data corresponding to each group-performance presentation period. For example, the information creation module 110 configures group-performance presentation mapping data that maps each group information to each presentation information corresponding to each period, as shown in Table 1 in the next page. In these embodiments, the group information refers to group control information for controlling the light-emitting devices 200 based on each group-performance scene corresponding to each group-performance presentation period. The group control information corresponding to each group includes group identification information and corresponding light-emission state information. That is, the light-emitting devices 200 having the same group identification information corresponding to each group-performance presentation period have the same light-emission state information. Further, the light-emitting devices 200 having the same group identification information is different between the group-performance presentation periods. For example, the light-emitting devices 200 having A group identification information in the first group-performance presentation period is configured to have B group identification information in the second group-performance constituting scene. In other words, light-emitting devices 200 belonging to the A group in the first group-performance presentation period and light-emitting devices 200 belonging to the A group in the second group-performance presentation period are different from each other.

TABLE 1

| | | Presentation information (e.g., scene information) | | | | |
|---|---|---|---|---|---|---|
| | | 1 | | 2 | | . . . |
| Group information | Group-based light emission information | A | (255, 255, 0) | A | (0, 0, 0) | |
| | | B | (154, 112, 55) | B | (255, 0, 0) | |
| | | C | (0, 0, 255) | C | (0, 0, 255) | |
| | | D | (0, 255, 255) | | | |
| | | E | (100, 100, 100) | | | |

In some embodiments, the storage 120 includes memory, cache, buffers, etc. The storage 120 according to some embodiments stores data received or generated from other components of the control device 100 or other components of the light-emission control system 10. In some embodiments, the storage 120 stores each group-performance presentation mapping data corresponding to each group-performance presentation period generated by the information creation module 110.

In some embodiments, the information provision module 130 provides, to corresponding light-emitting devices 200, each group information corresponding to each group-performance presentation period, which is mapped according to a layout of the seats, based on each group-performance presentation mapping data.

In some embodiments, the controller 140 generates a control signal including corresponding light-emission state information mapped to a corresponding group-performance scene to be presented in a corresponding group-performance presentation period based on corresponding group-performance presentation mapping data. Then, the controller 140 broadcasts the generated control signal via wireless communication. For example, in a process of conducting a group-performance in a venue, in the first group-performance presentation period (e.g., first time), the controller 140 obtains corresponding group information mapped to the first group-performance scene corresponding to the first group-performance presentation period (e.g., first time). According to the Table 1, the first presentation information includes mapping information five groups A, B, C, D, and E. Each of the groups A, B, C, D, and E has corresponding light-emission state information (e.g., RGB information). The controller 140 generates a control signal including each group mapped to the first group-performance presentation period and group information on the five groups including corresponding light-emission state information.

In some embodiments, the light-emitting devices 200 pre-stores only group information about which group each light-emitting device 200 belongs to the corresponding scene, prior to the group-performance presentation. In this case, the light-emission state information (e.g., color-information using RGB, etc.) is excluded from the pre-stored information. In some embodiments, the group information indicates that a bundle of the light-emitting devices 200 controlled to render the same color at a specific moment or scene. In other words, the group information is configured such that a plurality of light-emitting devices 200 controlled to render the same color in a specific scene have the same group information. In some embodiments, information about what color a corresponding group is controlled to render is excluded from the group information.

For this purpose, the light-emitting devices 200 according to some embodiments maintains the light-emission state information (e.g., color information) corresponding to the assigned group as empty data, or stores only dummy data or temporary color information therein. In some embodiments, an actual group-based color information is transmitted in real time while the actual group-performance proceeds.

Accordingly, in accordance with some embodiments of the present disclosure, the rendered color is changed in consideration of a mood or situation in the actual group-performance presentation process. Thus, instead of storing the color information in the light-emitting devices, flexible group-performance presentation is performed.

In some embodiments, control information to indicate a color to be rendered by a specific group in a specific scene is contained and transmitted, by the controller 140, in a control signal in real time in a process in which an actual performance is performed.

As in a conventional approach, individual identifications (IDs) are assigned to all light-emitting devices in the seats, respectively, and then, real-time light-emission signals are individually and respectively transmitted per individual IDs. This causes limiting an amount of data transmitted via wireless RF, thereby disallowing providing a smooth group-performance presentation. Further, this causes a number of light-emitting devices to be an out-of-control state. Furthermore, this causes a control signal delay to make it impossible to present an intended seats group image. For example, in a venue having 10,000 seats, conventionally, 10,000 RGB signal value data should be transmitted to 10,000 light-emitting devices respectively per each group-performance presentation period.

However, according to some embodiments of the present disclosure, a plurality of light-emitting devices 200 that are controlled to render the same color per each group-performance scene are grouped into the same group. In these embodiments, the group information to indicate a group corresponding to an individual light-emitting device 200 for each performance scene corresponding to the group-performance period is pre-stored. In the venue where the performance is performed, the control device 100 transmits only color information about a color corresponding to each group to each device 200. Thus, the amount of data transmitted by the control device 100 in each scene is greatly reduced compared to the conventional approach. For example, in a venue having 10,000 seats, when each of 20 light-emitting device groups is configured to render the same color in a specific scene, only 20 RGB signal value data are transmitted to the devices 200. Therefore, in accordance with the present disclosure, a single group-performance constituting scene is performed using only 0.2% of data transmission compared to data amount of the convention approach when the same number of the seats are used therebetween.

In some other embodiments, the group identification information pre-stored in the light-emitting devices 200 be configured by introducing and applying a virtual coordinate system to all seats in the venue, so that all of the seats are defined using specific coordinate values. Each seat has a specific XY coordinate value. Multiple adjacent seats have the same XY coordinate value range. Further, the present disclosure specifies a position of each of the seats via introduction of other types of coordinate systems in addition to the commonly used XY coordinate system.

When some or all of the group identification information pre-stored in the light-emitting devices are recorded as the coordinate information, the group-performance presentation mapping data transmitted in real-time in the group-performance venue include a control signal to specify a light-emitting devices group to light-emit a specific color based on one or more specific coordinate values or a specific coordinate range and to allow the specified light-emitting devices group to render the same specific color. That is, when the group identification information and group light-emission color information are mapped to each other to configure the group-performance presentation mapping data, the coordinate values or coordinate ranges are employed instead of the group identification information. In this case, each of the light-emitting devices receives the group-performance presentation mapping data in a process of presenting the group-performance, and, then determines, based on the coordinate value to which the cheering device belongs, whether the coordinate value of the cheering device is included in specific group identification information, and, then light-emits a corresponding color based on the determination result. When the group information employing the coordinate system configured for all of the seats of the venue is pre-stored in the light-emitting devices 200, a small amount of data transfer allows impromptu presentation of an illumination-based group-performance scene from the seats. That is, the control device generates or modifies and broadcasts the group-performance presentation mapping data to light-emit a predetermined color from the cheering devices group having a specific coordinate range, thereby allowing variable seats illumination presentation.

For example, all of the seats in the venue is defined using the XY coordinate system. Further, a predetermined XY coordinate is pre-assigned to each light-emitting device in a specific group-performance presentation period. In this case, when implementing a corresponding group-performance presentation period in a real-time group-performance presentation process, group-performance presentation mapping data configured such that a device group in a specific coordinate range (e.g., {10, 10} to {20, 15} renders a red color (255, 0, 0) is transmitted to the plurality of light-emitting devices 200. Thus, upon receiving the data, each of the plurality of light-emitting devices 200 individually determines whether each device belongs to the range from {10, 10} to {20, 15} based on the coordinate information assigned to each device. Then, upon determination that each device belongs to the range, each device renders the red color.

In some other embodiments, as shown in FIG. 16, when presenting a specific graphic (e.g., "BIGBANG IS VIP"), and a specific figure and pattern from a middle region seats, as a group-performance scene, it is assumed that the specific text is presented using a red color (255, 0, 0), and the specific figure and pattern are presented using a green color (0, 255, 0). In this case, conventionally, RGB signal value data are individually transmitted to each of all light-emitting devices irrespective of information such as a specific pattern or a light-emission pattern for a group-performance scene to present the specific text and specific figure and pattern as shown in FIG. 16. However, according to the present disclosure, with considering the information such as the specific pattern or light-emission pattern for the group-performance scene, light-emitting devices that render the same color are grouped into one group. Then, light emission control is executed on a group basis. Accordingly, the light-emitting devices that present the specific text using a red color (255, 0, 0) are configured in a single group. The light-emitting devices that present the specific shape and pattern with a green color (0, 255, 0) are configured in another single group. Thus, RGB signal value data (only the red signal value and the green signal value) are transmitted to the two groups respectively to present the scene shown in FIG. 16. As described above, the method of controlling the group-performance in accordance with the present disclosure effectively transmits and receives the data compared to the conventional method of individually controlling the light-emitting devices. Thus, some embodiments according to the present disclosure allow a frequency band to be efficiently used and allow tens of thousands of light-emitting devices to be controlled simultaneously without delay.

According to some embodiments of the present disclosure as described above, unlike the conventional approach, the amount of data to be transmitted is greatly reduced in the wireless RF data transmission process. Thus, some embodiments according to the present disclosure allow only the necessary data to be transmitted to all of the light-emitting devices 200 in the seats without using an entire wireless bandwidth. In other words, using only a portion of the entire wireless bandwidth, the control signal is sent to the light-emitting devices 200 while a remaining bandwidth region is empty. Thus, in some embodiments of the present disclosure, a dynamic group-performance scene is instantly presented using the empty wireless bandwidth region. In some embodiments, the control device 100 pre-transmits new presentation data or added or modified presentation data to the light-emitting devices 200 over the empty wireless bandwidth region. For example, the control device 100 calculates a time taken to transmit the data using the vacant wireless bandwidth region, configure presentation data based on the calculated time and then transmit the configured data to the light-emitting devices 200. Thus, the present system presents not only the previously defined group-performance scene, but also a new group-performance scene instantly. Thus, some embodiments according to the present disclosure allow immediate designing and modifying a variety of group-performance presentations in the group-performance venue.

In some other embodiments, the group-performance presentation mapping data transmitted in real-time at the venue where the performance is going on further include dimming information required when each group render the corresponding color. For example, an A group is rendering a specific color in a specific group-performance presentation period (for a specific seats presentation scene). In this case, the A group should repeatedly turn on and off at a specific time interval. In these embodiments, when turn on and turn off signals are transmitted repeatedly, a large amount of signals are broadcast for a short period of time. Thus, an amount of data to be processed by the cheering device increases to cause a data processing delay. When the time interval is shortened to, for example, 0.5 seconds or smaller, a certain data processing delay occurs due to the real time data transmission, which causes an undesirable group-performance scene. Therefore, in the specific group-performance presentation period in which the blinking (turning off and on) should be implemented, the group-performance presentation mapping data is transmitted only once at an initial start time of the period, and, further, information on the blinking interval and turn-on or turn-off duration are contained in the corresponding group-performance presentation mapping data. Thus, upon receiving the group-performance presentation mapping data, a light-emitting device belonging to the specific group A conducts the blinking illumination presentation for a predetermined time duration.

Figure 4:
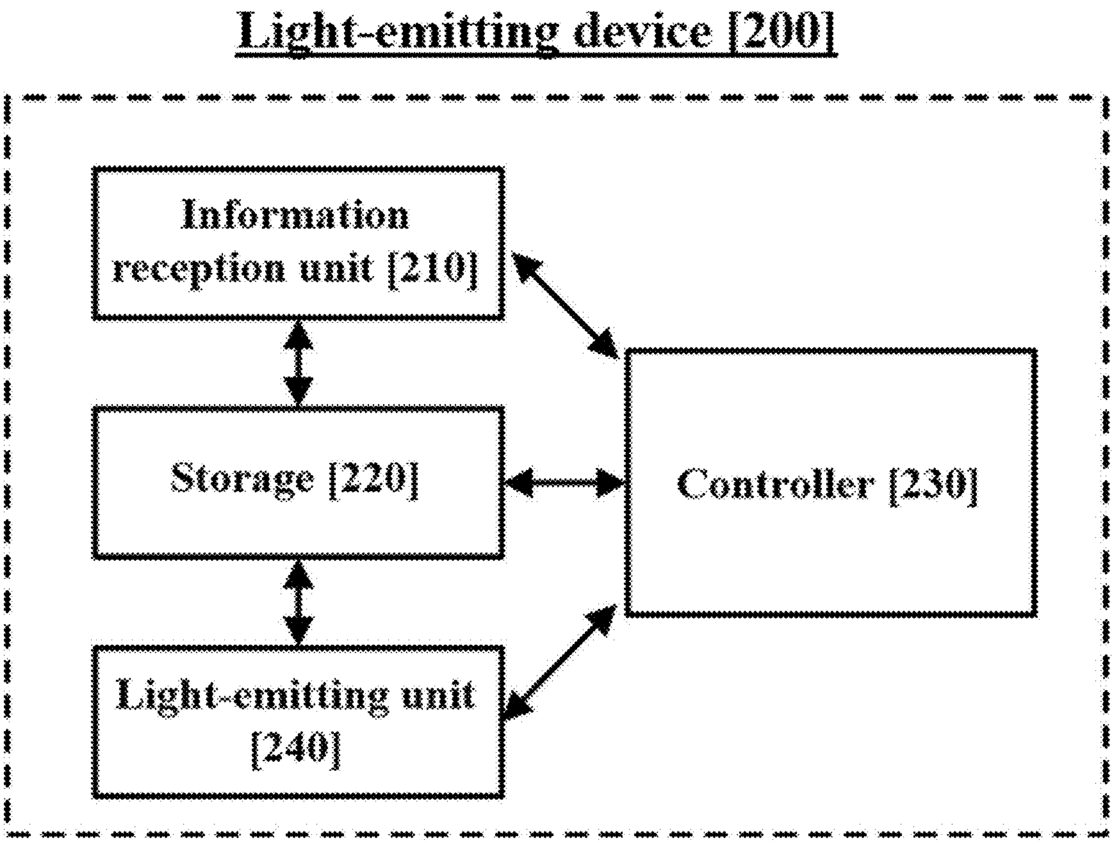
FIG. 4 is a schematic diagram showing a configuration of a light-emitting device according to some embodiments of the present disclosure.

FIG. 4 is a schematic diagram showing a configuration of a light-emitting device according to some embodiments of the present disclosure.

Each of the light-emitting devices 200 according to some embodiments of the present disclosure is a cheering light-emission rod or a cheering body-mounted device, which is carried by the audience to conduct the group-performance presentation. The light-emitting devices 200 are respectively mapped to the seats in the venue in a 1:1 manner. The light-emitting devices 200 allow the seats to act as a display or a sign board or a media façade for displaying images in a darkened state or similar state of the venue.

In some embodiments, each of the light-emitting devices 200 pre-stores therein seat presentation data using each of the light-emitting devices 200 in the seats prior to the group-performance presentation.

In some other embodiments, as previously illustrated, the light-emitting devices 200 only store the group information about which group each light-emitting device 200 belongs to per each scene prior to the group-performance presentation. In this case, the light-emission state information (e.g., color information) is omitted from the pre-stored information. The group information refers to a bundle of light-emitting devices controlled to render the same color at a specific moment or in a specific scene.

To this end, the light-emitting devices 200 maintain the light-emission state information (e.g., illumination color information) corresponding to each group as empty data, or store only dummy data or temporary color information therein. That is, an actual group-based color information is transmitted in real time while the actual group-performance proceeds.

That is, the group information is configured so that a plurality of light-emitting devices, which are controlled together to render the same color in a specific scene have the same group information. In this circumstance, information about what color the corresponding group is controlled to render is excluded from the group information, and the rendered color is changed in consideration of a mood or situation in the actual group-performance presentation process. Thus, instead of storing the color information in the light-emitting devices, flexible group-performance presentation is performed.

Referring to FIG. 4, each of the light-emitting devices 200 according to some embodiments of the present disclosure includes an information reception module 210, storage 220, a controller 230, and a light-emitting unit 240.

In some embodiments, the information reception module 210 connects with another device to receive information therefrom. In some embodiments, the information reception module 210 includes a wired communication module or a wireless communication module. For example, the module 210 includes an RF transceiver, a ZigBee module, a Bluetooth module, a Wi-Fi module, and the like.

In some embodiments, the information reception module 210 receives the group-performance presentation mapping data from the control device 100 and then extracts, from the mapping data, the group information mapped to seat position information of a corresponding light-emitting device, corresponding to each group-performance presentation period. In some alternative embodiments, the information reception module 210 receives, from the information processing device 300 as described later, the group-performance presentation mapping data pre-defined in seat position information of a corresponding light-emitting device, and, then extracts, from the mapping data, the group information corresponding to each group-performance presentation period.

In some embodiments, the information reception module 210 receives the group information mapped to the seat position information of the corresponding light-emitting device, corresponding to each group-performance presentation period, and configures group mapping data as shown in Table 2 below:

TABLE 2

| Presentation information (e.g., scene information) | 1 | 2 | 3 | 4 | 5 | . . . |
|---|---|---|---|---|---|---|
| Group information | A | C | F | G | {15, 15} | . . . |

The Table 2 above is example data of group information corresponding to a presentation scene for one specific light-emitting device 200. The specific light-emitting device 200 is controlled to belong to an A group in the first scene and is controlled in the same manner as other light-emitting devices belonging to the A group. Further, when the first scene is switched to a second scene, the specific light-emitting device 200 is controlled to belong to a C group.

As described above, in the process of pre-recording the group information in each light-emitting device 200, only information about the group to which each device 200 belongs is stored, and information about light-emission state (e.g., color) which the group to which each device 200 belongs will render is not stored. Accordingly, the control device 100 includes light-emission state information (e.g., color information) into the control signal based on previous presentation data, and, then transmits the control signal to all or some of the light-emitting devices 200 positioned in the venue. For example, in the preliminary presentation preparation process, the group A is configured to render a red color (255, 0, 0) in the first scene. However, in consideration of venue atmosphere and interaction with audience, the control signal is modified and broadcast such that the group A renders the green color (0, 255, 0). In these embodiments, there is no position change in the number of light-emitting devices belonging to the group A controlled to render the green. Thus, a distribution of the seats occupied by the plurality of light-emitting devices belonging to the group A, and a shape and pattern outline defined by the plurality of light-emitting devices are not modified. At this time, only the color rendered by the light-emitting devices belonging to the group A change from the red to the green.

In some embodiments, the outline of the shape or pattern presented from the seats is dynamically modified by sending a control signal to indicate that the same color is rendered by groups that was controlled to render different colors. For example, the specific light-emitting device is controlled to belong to an F group in a third scene. Then, the control device 100 transmits a control signal to indicate that the F group and adjacent G group render the same color. Thus, the multiple light-emitting devices belonging to the F group and G group present a new pattern or shape.

In some other embodiments, as in a fifth scene, a format of the group identification information is embodied as coordinate type information rather than a specific group code. As described above, the group identification information stored in advance in the light-emitting device is defined as a specific coordinate value or range via the introduction and application of a virtual coordinate system for all of the seat in the venue. One seat has a specific XY coordinate value. Multiple adjacent seats according to some embodiments have the same XY coordinate range. Further, the present disclosure specifies positions of the seats via introduction of other types of coordinate systems in addition to the commonly used XY coordinate system. The light-emitting device receives the group-performance presentation mapping data in the process of conducting the performance. Based on the coordinate value to which the cheering device belongs, the cheering device determines whether the position of the cheering device is included in the specific group identification information. Then, in a positive determination result, a corresponding color is rendered by the cheering device. For example, in the real-time group-performance presentation process, the group-performance presentation mapping data corresponding to the fifth scene is configured to allow the cheering devices in a range of from {10, 10} to {20, 20} to render a red color (255, 0, 0). In this case, upon receiving the mapping data, one specific light-emitting device 200 determines that the specific device belongs to the range from {10, 10} to {20, 20} based on the coordinate information {15, 15} assigned thereto, and, then renders the red color.

In some embodiments, the storage 220 includes a memory, a cache or a buffer. The storage 220 stores data received or generated from other components of the light-emitting device 200, the control device 100, or the information processing device 300. In some embodiments, the storage 220 stores the seats position information of the venue, and group mapping data based on the seats position information as received by the information reception module 210.

As described above, in some embodiments, the mapping data information reception module 210 receives, from an external device (e.g., control device 100, information processing device 300, etc.), the seats position information, and the group mapping data based on the seats position information, and store the received data or information in the storage 220. In some alternative embodiments, a user inputs entrance ticket information via a PC or a smart device. The information reception module 210 receives the group mapping data mapped to the input entrance ticket information via a wired/wireless communication module and stores the received group mapping data in the storage 220.

In some embodiments, the controller 230 receives a control signal from the control device 100. In these embodiments, a control signal corresponding to group information about a group of the light-emitting devices 200 is selectively received by the controller 230. In some embodiments, the controller 230 selectively extracts, from the control signal, only the light-emission state information corresponding to the group information about the group of the light-emitting devices 200 from the control signal, based on group mapping data according to the seats position information. Then, the controller 230 controls the group of the light-emitting devices 200 to operate light-emitting units 240 thereof based on the extracted light-emission state information.

In some embodiments, the light-emitting unit 240 includes one or more light source elements. For example, a light emitting diode (LED), or the like is used as the light source element. Further, the light-emitting unit 240 outputs light of various colors based on the RGB color information using the light source device.

Figure 5:
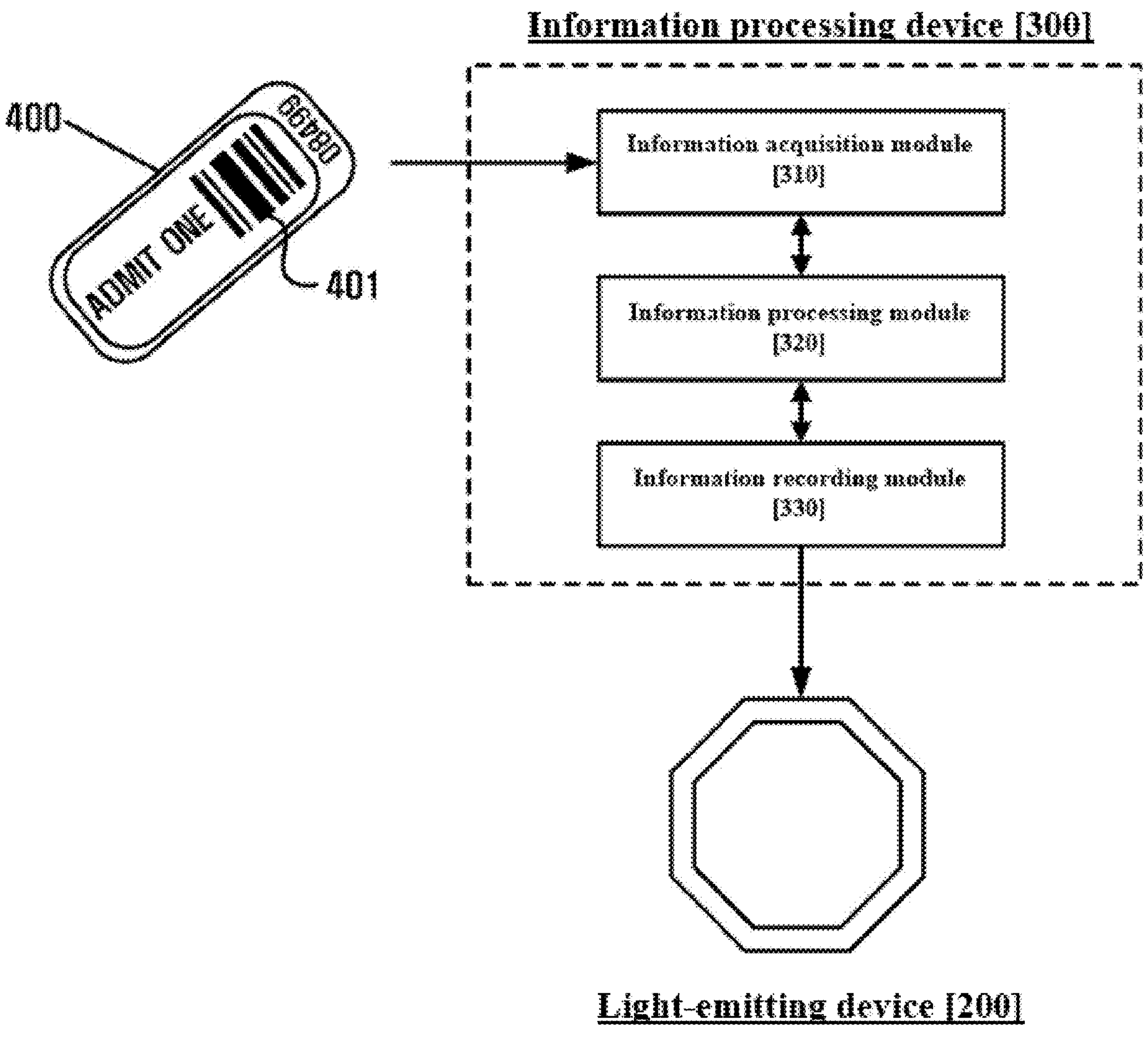
FIG. 5 is a schematic diagram showing a configuration of an information processing device and its interactions with other device, according to some embodiments of the present disclosure.

FIG. 5 is a schematic diagram showing a configuration of an information processing device and its interactions with other device, according to some embodiments of the present disclosure.

Referring to FIG. 5, the information processing device 300 according to some embodiments of the present disclosure is configured for processing the group information in advance such that the processed group information is to be stored in the light-emitting devices 200. The information processing device 300 according to some embodiments includes an information acquisition module 310, an information processing module 320, and an information recording module 330.

In some embodiments, the information acquisition module 310 acquires the seats position information of the venue. The seats position information refers to position information of the seats where the light-emitting devices 200 are positioned in the venue. For example, the seats position information includes a seat number of each of the seats. Alternatively, the seats position information is additional information configured for position identification of the light-emitting devices 200 to be positioned in a corresponding manner to the seats.

In some embodiments, the information acquisition module 310 obtains the seats position information from a pre-issued entrance ticket, or obtains the seats position information pre-stored in the light-emitting devices 200 therefrom. For example, the module 310 extracts the seats position information by recognizing electronic code information 401 such as a bar code, a QR code, etc., which is printed on an entrance ticket 400 of an electronic form transmitted into a smart device or on a paper ticket. Alternatively, the seats position information is obtained from electronic code information embedded in the light-emitting device 200 or identification information assigned to the light-emitting device 200. Alternatively, the user reads a seat number printed on the ticket and inputs the number into the device 300. Then, the information acquisition module 310 obtains the seats position information from the input seat number.

Further, the information acquisition module 310 according to some embodiments is configured to include an optical scanner or a kiosk capable of recognizing the electronic code information such as a bar code, a QR code, and the like. In this case, the information acquisition module 310 recognizes the electronic code information of the ticket and the information processing device 300 receives from the module 310 the electronic code information via a physical medium or over a network. According to some embodiments, the information acquisition module 310 is configured separately from the information processing device 300.

In some embodiments, the information processing module 320 checks group-performance presentation mapping data preset for a corresponding position based on the seats position information. In some embodiments, the information processing module 320 checks group information corresponding to a group-performance constituting scene mapped to the corresponding seats position information from the group-performance presentation mapping data stored in the control device 100 or a database of the external server. According to some embodiments, the information processing device 300 pre-receives and pre-stores the group-performance presentation mapping data from the control device 100 or from the database of the external server.

Further, in some embodiments, the information processing module 320 configures the group-performance constituting scene mapped to the seats position information, and the group information corresponding to the group-performance constituting scene into a format (e.g., group mapping data in Table 2 above) that is provided to the emitting devices 200.

In some embodiments, the information recording module 330 records the group-performance constituting scenes and group information independently assigned to each of the group-performance constituting scenes based on the group-performance presentation mapping data, into light-emitting devices 200 having corresponding seats position information. In these embodiments, the information recording module 330 records, as the group information, only the group identification information of the group to which the light-emitting devices 200 belong, in a manner corresponding to each group-performance constituting scene. The module 330 does not record, as the group information, the light-emission state information corresponding to each group identification information. In this case, the module 330 maintains the light-emission state information corresponding to each group identification information as empty data, or records dummy data or temporary information in the cheering devices.

In some embodiments, the information recording module 330 includes a communication device that easily transmits and receives information, such as an RF tag device, an NFC input device, and an IR (infrared ray) device. In this case, the information processing device 300 tags the light-emitting devices 200 via the information recording module 330, such that the group-performance constituting scene mapped to the seats position information and the group information corresponding to each group-performance constituting scene is recorded into the light-emitting devices 200. According to some embodiments, the information recording module 330 is configured separately from the information processing device 300.

The information processing device 300 according to some embodiments of the present disclosure is carried by the together with a ticket and light-emitting device 200 who enters the venue. When the reaches the venue, ticket matching and validity are confirmed via the information acquisition module 310. Once confirmed successfully, the information processing module 320 checks seats presentation data (group-performance presentation mapping data) previously configured based on a sports or arts performance timetable. Thus, the group information corresponding to the group-performance constituting scene based on the corresponding seat is checked by the information processing module 320. The information processing module 320 records the checked information into the light-emitting devices 200 via the information recording module 330.

In some other embodiments of the present disclosure, without using the information processing device 300, a user (e.g., spectator or audience) directly records, into the light-emitting devices 200, the group information corresponding to each group-performance constituting scene mapped to the corresponding seats position information. For example, a user enters ticket information printed on a paper ticket or electronic form ticket via a PC or a smart device. Then, based on the ticket information the user has entered, the user (user device) checks the seats presentation data (group-performance presentation mapping data) pre-configured based on a sports or arts performance timetable. Thus, the group information corresponding to the group-performance scene for the corresponding seat is acquired by the user. The obtained corresponding information is recorded by the user (user device) into the light-emitting devices 200 via a short-range wireless communication module such as NFC or Bluetooth or a wired cable such as a micro 5-pin. In this process, the user uses a user device such as a PC or a notebook computer to record the data into the light-emitting devices via a wired or wireless connection. For example, the data are recorded on the light-emitting device while the data are downloaded into a smartphone from the PC or laptop. Further, the group information is directly recorded onto the light-emitting device while the information is downloaded from the smart phone via a wireless Internet module into the cheering device. In these embodiments, a smart device such as a smart phone has an application installed therein to execute a method of controlling the group-performance according to the present disclosure. Such an application is used to perform the above-described process.

In one example, when the information processing device 300 records the group information corresponding to the group-performance constituting scene into the light-emitting devices 200 as described above, the light-emitting units 240 of the light-emitting devices 200 emits a predetermined color. Accordingly, it is confirmed that the corresponding information is successfully downloaded to the light-emitting devices 200 via the information processing device 300.

Hereinafter, a method of controlling group-performance in a venue according to the present disclosure as performed by the control device 100, the light-emitting devices 200, and the information processing device 300 is described.

Figure 6:
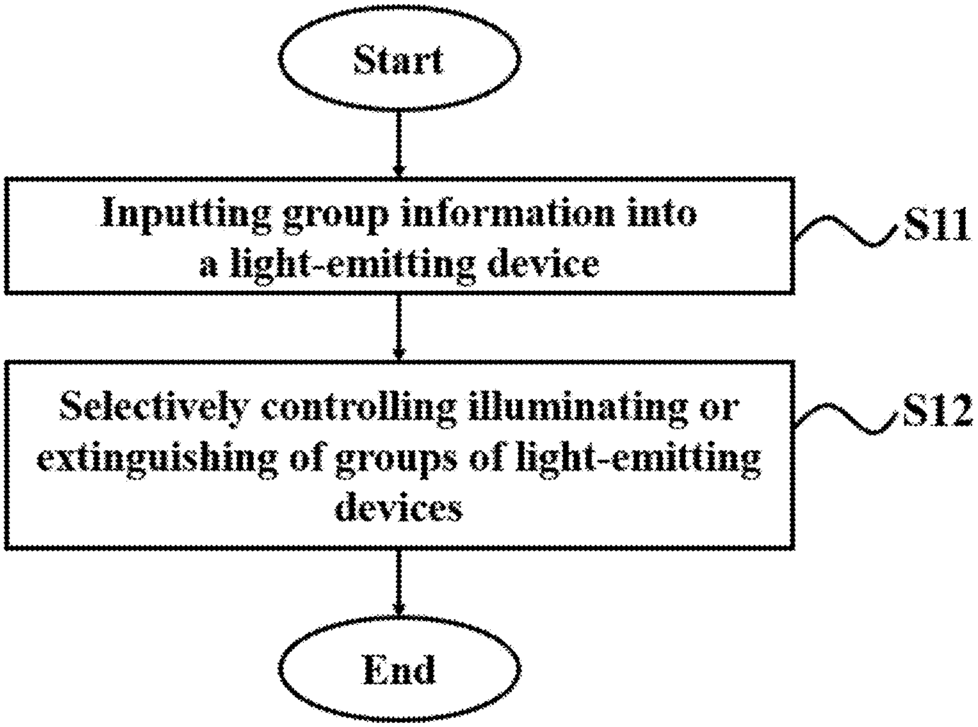
FIG. 6 is a flow chart illustrating a method for controlling a group-performance according to some embodiments of the present disclosure.

FIG. 6 is a flow chart illustrating a method for controlling a group-performance according to some embodiments of the present disclosure.

In the method of FIG. 6, group information is firstly inputted into a respective light-emitting device S11. In here, the group information to be inputted corresponds to a seat in a venue, on which the respective light emitting device to be positioned.

In some embodiments, the group information is inputted into the light emitting devices when such light-emitting devices performs a process of entering the venue of the event, at home, at a transportation, or at an entrance of the venue.

In some embodiments, the process of inputting the group information includes reading ticket information of a user of the light-emitting device, identifying where the light-emitting device is configured to be positioned, based on the read ticket information, retrieving the group information that corresponds to the identified position of the light-emitting device, and inputting the retrieved group information into the light-emitting device. In particular, the reading ticket information is performed when the light-emitting device performs a process of entering the venue of the event, according to some embodiments.

In some embodiments, the process of inputting the group information includes updating the group information, wirelessly broadcasting the updated group information across the venue during the event, and receiving, by the respective light-emitting device, the updated group information.

In some embodiments, the process of inputting the group information includes inputting the group information into the respective light-emitting device when the respective light-emitting device is approaching within a predetermined distance from a group information distribution device located in an entrance of the venue.

In some embodiments, the process of inputting the group information includes inputting only group identification information into the respective light-emitting device, without inputting instructions to control illuminating or extinguishing of the respective light-emitting device during the particular period of the group-performance presentation, when the respective light-emitting device performs the process of entering the venue of the event, and after the event has started, wirelessly transmitting additional group information that includes the instructions, to the respective light-emitting device, in accordance with the group identification information.

Next, groups of light-emitting devices are selectively controlled to illuminate or extinguish, in accordance with the group information, to present an image over the plurality of light-emitting devices positioned on seats in the venue of an event during a particular period of a group-performance presentation S12.

In some embodiments, the group information includes a first group identification to be assigned to the respective light emitting device during a first particular period of the group performance presentation, and a second group identification to be assigned to the respective light emitting device during a second particular period of the group performance presentation. In some embodiments, the first particular period and the second particular period correspond to a first scene and a second scene of the group performance presentation, respectively, and a first image presented by light emitting devices to which the first group identification is assigned is different from a second image presented by light emitting devices to which the second group identification is assigned.

Figure 7:
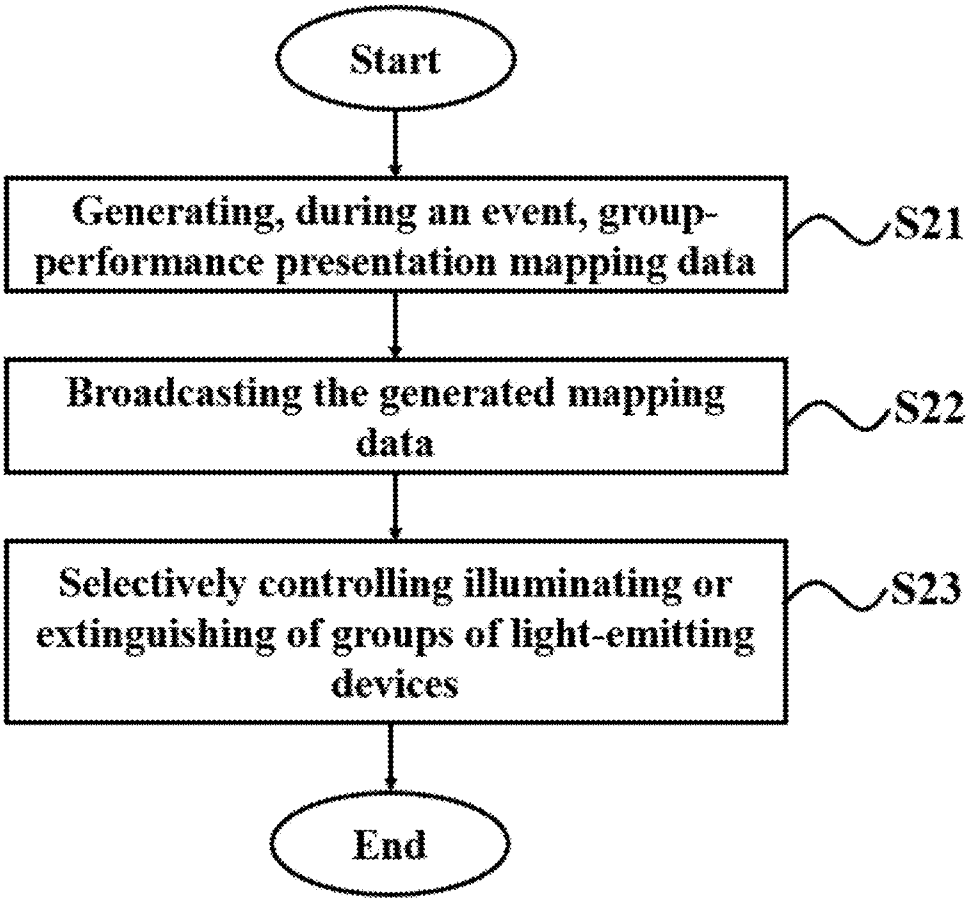
FIG. 7 is a flow chart illustrating a method for controlling a group-performance according to some other embodiments of the present disclosure.

FIG. 7 is a flow chart illustrating a method for controlling a group-performance according to some other embodiments of the present disclosure.

In the method of FIG. 7, group-performance presentation mapping data is firstly generated S21. The group-performance presentation mapping data includes information on mapping between a group and a color configured to be emitted by light-emitting devices belonging to the group during a particular period of a group-performance presentation.

In some embodiments, the process of generating the group-performance presentation mapping data includes generating a first group-performance presentation mapping data with respect to a first particular period of the group performance presentation, and generating a second group-performance presentation mapping data with respect to a second particular period of the group performance presentation.

Next, the generated mapping data is broadcasted across a venue of the event S22.

Next, groups of light-emitting devices is selectively controlled to illuminate or extinguish, in accordance with the mapping data, to present an image over the plurality of light-emitting devices positioned on seats in the venue of the event during the particular period of the group-performance presentation S23.

In some embodiments, the method of FIG. 7 further includes receiving, by a respective light-emitting device, the broadcasted mapping data, extracting, by the respective light-emitting device, a part of the broadcasted mapping data, which corresponds to a group identification of the respective light-emitting device, and controlling illuminating or extinguishing, by the respective light-emitting device, in accordance with the extracted part of the broadcasted mapping data.

In some embodiments, the first particular period and the second particular period correspond to a first scene and a second scene of the group performance presentation, respectively. In some embodiments, a first image presented by light emitting devices to which the first group identification is assigned is different from a second image presented by light emitting devices to which the second group identification is assigned.

Figure 8:
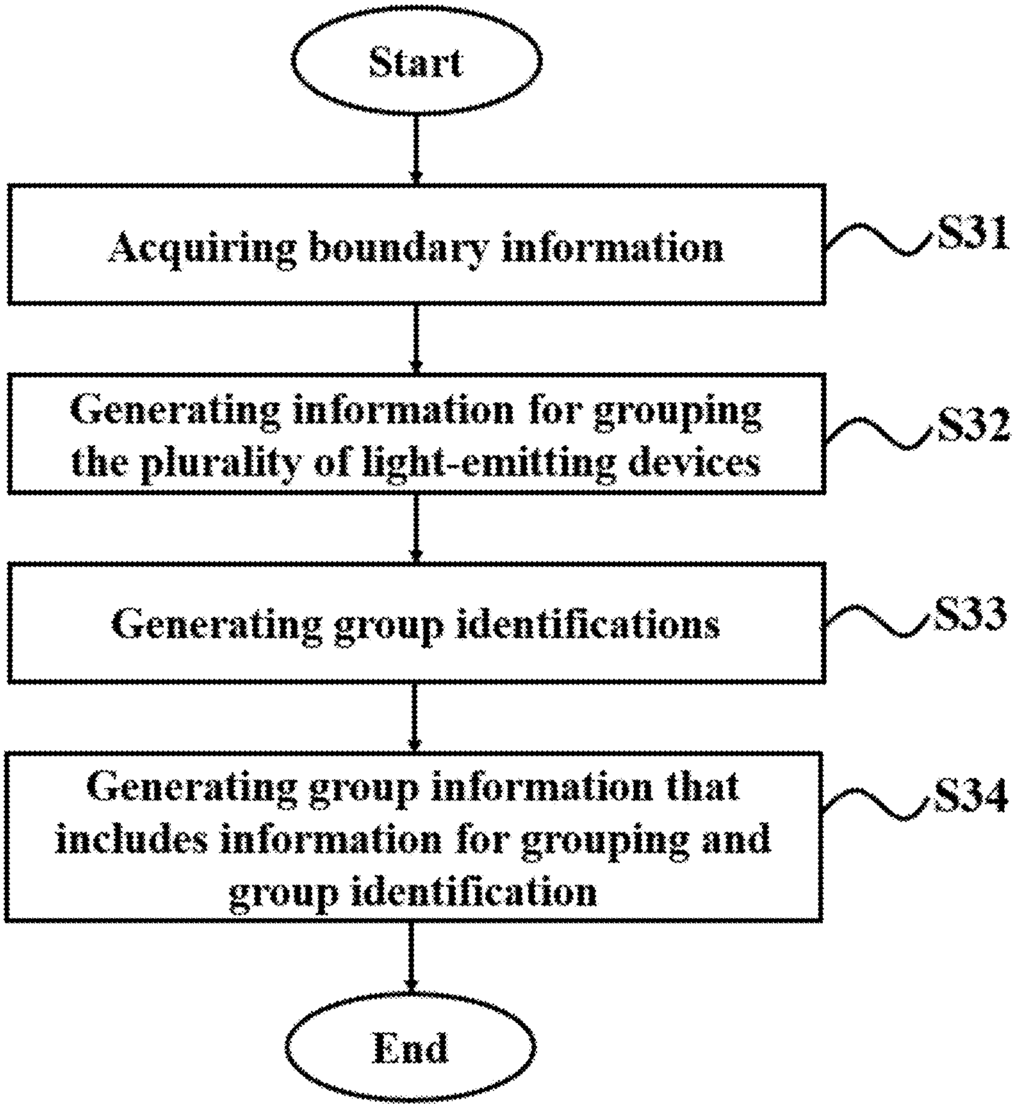
FIG. 8 is a flow chart illustrating a method for controlling a group-performance according to yet other embodiments of the present disclosure.

FIG. 8 is a flow chart illustrating a method for controlling a group-performance according to yet other embodiments of the present disclosure.

In the method of FIG. 8, boundary information of each group of light-emitting devices in each scene of a group performance presentation is firstly acquired S31.

Next, based on the acquired boundary information, information for grouping the plurality of light-emitting devices is generated S32. In here, each of which is mapped to a respective seat in a venue of an event.

Next, group identifications to be assigned to the plurality of light-emitting devices is generated S33. In here, light-emitting devices included in the same group are configured to be assigned the same group identification.

Next, group information that includes the generated information for grouping the plurality of light-emitting devices and the generated group identification is generated S34.

In some embodiments, the method of FIG. 8 further includes inputting the generated group information to the plurality of light-emitting devices, and inputting instructions to control a respective group of light-emitting devices to emit a respective color during a particular period of the group-performance presentation.

In some embodiments, the information for grouping the plurality of light-emitting devices does not include instructions to control a respective group of light-emitting devices to emit a respective color during a particular period of the group-performance presentation.

In some embodiments, the particular period includes a first particular period and a second particular period. In some embodiments, the first particular period and the second particular period correspond to a first scene and a second scene of the group performance presentation, respectively, and a first image presented by light emitting devices to which a first group identification is assigned is different from a second image presented by light emitting devices to which a second group identification is assigned.

Figure 9:
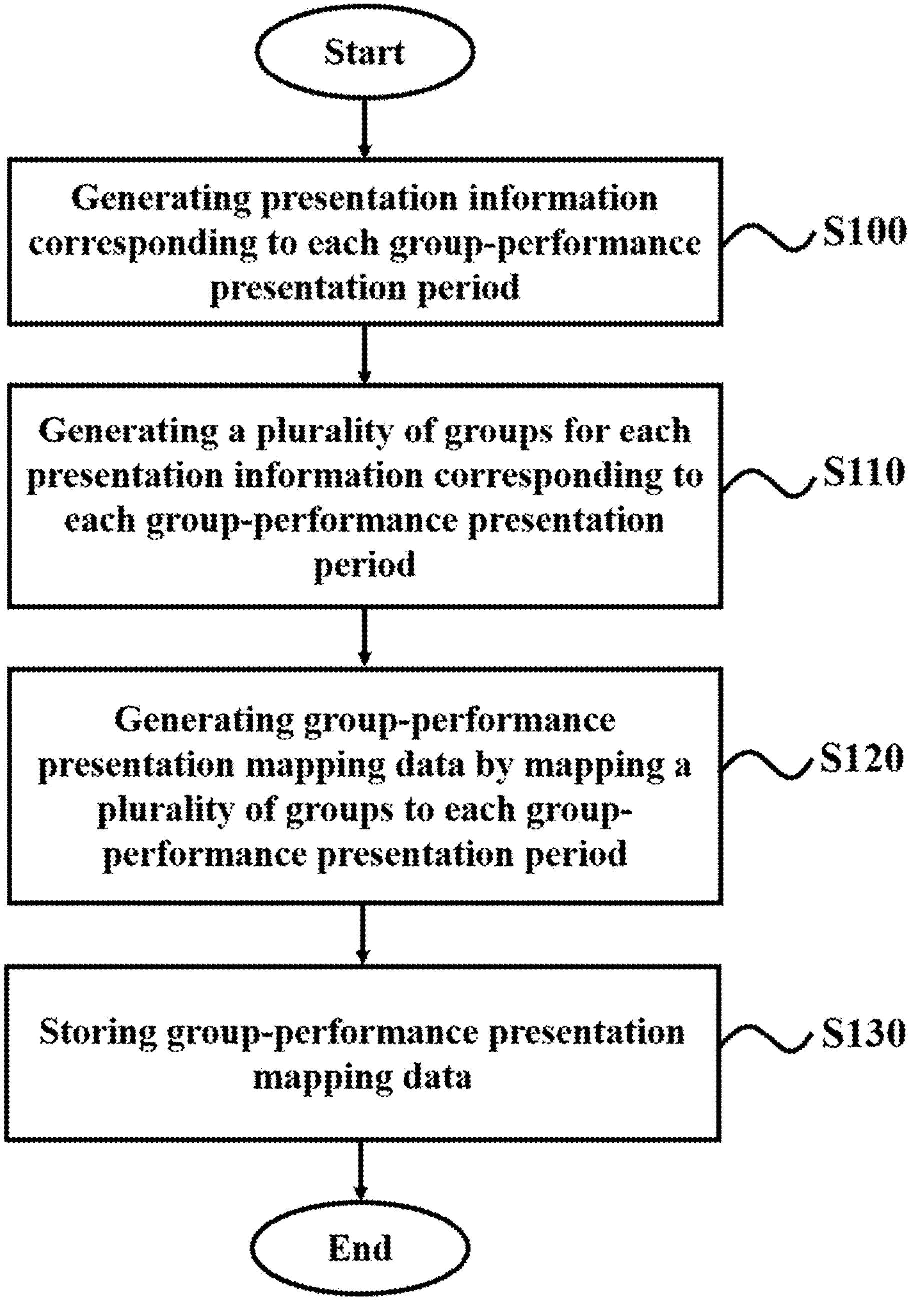
FIG. 9 is a flow chart illustrating a preliminary group-performance preparation process in a method for controlling a group-performance according to some embodiments of the present disclosure.

FIG. 9 is a flow chart showing a preliminary group-performance preparation process as performed by a control device in a method for controlling group-performance according to some embodiments of the present disclosure.

Referring to FIG. 9, in some embodiments, the information creation module 110 of the control device 100 creates a group-performance scene to be presented using the light-emitting devices 200 positioned in the seats in the venue during sport play or art performance S100. In these embodiments, the information creation module 110 configures at least one group-performance scene, in consideration of sports play or arts performance time or a group-performance scene to be presented via the light-emitting devices 200. Each group-performance scene is created in a corresponding manner to each group-performance presentation period.

In some embodiments, the information creation module 110 groups the seats into plural groups based on light-emission state information that is configured on a group basis based on each group-performance scene created in a corresponding manner to each group-performance presentation period. Then, the module 110 defines a plurality of groups corresponding to each group-performance scene corresponding to each group-performance presentation period S110.

In some embodiments, the information creation module 110 determines a single set of groups configured based on light-emission state information capable of presenting each group-performance scene created correspondingly to each group-performance presentation period, based on seats layout information. The module 110 divides the seats into a plurality of groups correspondingly to the determined single set of groups and create group information corresponding to each group. For example, when the first group-performance scene corresponding to the first group-performance presentation period is conducted using five light-emission state information (e.g., RGB color combinations) as shown in Table 1, the information creation module 110 divides the seats into five groups (e.g., A, B, C, D, and E) based on the seats layout. Then, the module 110 generates multiple seat groups corresponding to each presentation information.

In some embodiments, the information creation module 110 maps a plurality of groups to each group-performance scene corresponding to each group-performance presentation period based on the seats layout information and light-emission state information. Thus, the module 110 generates each group-performance presentation mapping data corresponding to each group-performance presentation period S120.

In some embodiments, each group-performance presentation mapping data includes each group-performance scene to be presented correspondingly to each group-performance presentation period, and grouping information corresponding to each group-performance scene. In the mapping data, a relationship between each group-performance scene and each grouping information is tabulated. In these embodiments, the group information includes the group identification information corresponding to the corresponding group-performance scene, the light-emission state information to be presented by the corresponding group, and the seats position information belonging to the corresponding group. The light-emission state information refers to information indicating the light-emission state output through the light sources of the light-emitting devices 200. The state information includes color information such as RGB, a light source brightness, a light source blinking, a blinking time, a blinking rate, and the like. In one example, the group-performance presentation period and the corresponding group-performance presentation mapping data are configured in a form of a table as shown in Table 1 above. However, this is only one example and the present disclosure is not limited thereto.

In some embodiments, the information creation module 110 stores the group-performance presentation mapping data corresponding to the group-performance presentation period into the storage 120 at S130. According to some embodiments, group-performance presentation mapping data corresponding to the group-performance presentation period are transmitted to an external device and stored on the external device.

Although the above-described operations S100 to S130 are illustrated as being performed by the control device 100, the present disclosure is not limited thereto. In some embodiments, the above-described operations S100 to S130 are implemented by a device (hereinafter, simulation device) that performs a simulation function as separately configured from the control device 100. In this case, the simulation device performs the operations S100 to S130. Then, the group-performance presentation mapping data corresponding to the group-performance presentation period as created by the simulation device are provided to the control device 100. In this case, the information creation module 110 acquires the group-performance presentation mapping data corresponding to the group-performance presentation period from the simulation device and store the group-performance presentation mapping data in the storage 120.

Figure 10:
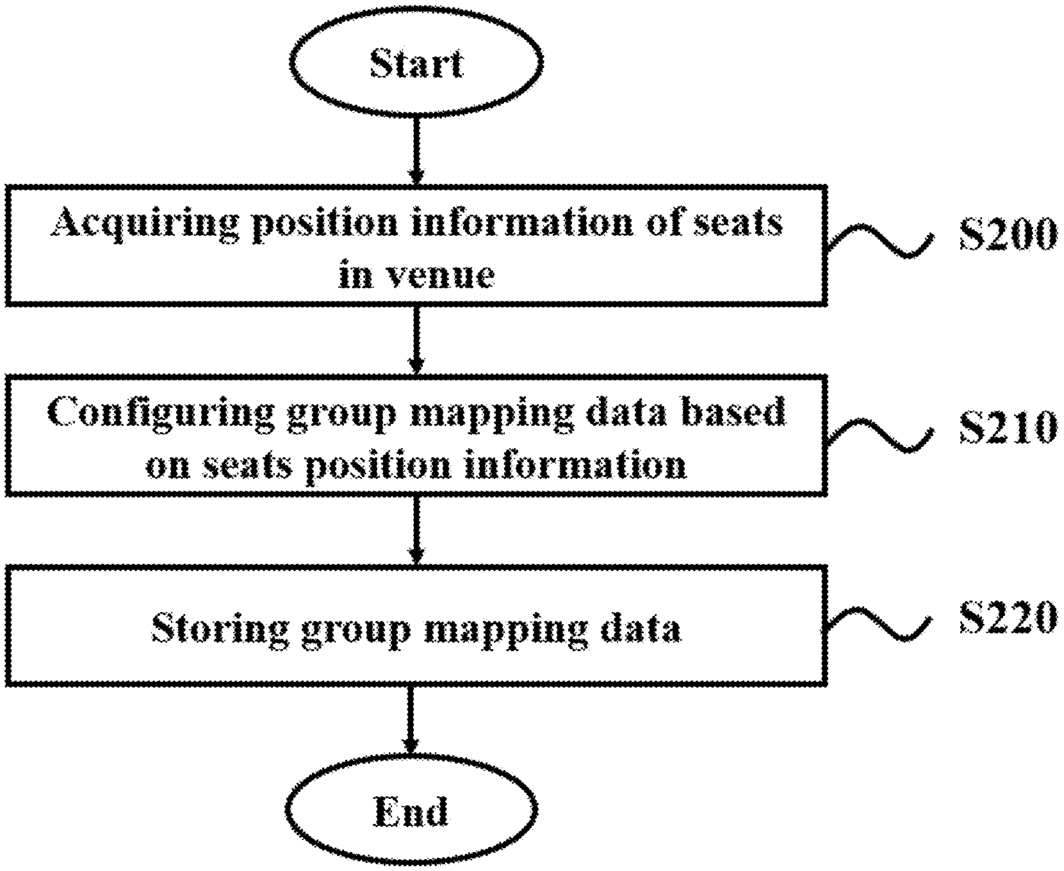
FIG. 10 is a flow chart illustrating a preliminary group-performance preparation process in a method for controlling a group-performance according to some embodiments of the present disclosure.

FIG. 10 is a flow chart illustrating a preliminary group-performance preparation process performed by a light-emitting devices in a method for controlling group-performance according to some embodiments of the present disclosure.

Referring to FIG. 10, in some embodiments, the information reception module 210 of each of the light-emitting devices 200 acquires the seats position information of a venue where the light-emitting devices 200 are to be positioned S200. In these embodiments, the seats position information refers to identification information of the seats preset according to the seats layout of the venue as described above. The seats position information includes, for example, the seat numbers of the seats. Alternatively, the seats position information includes position identification of the light-emitting devices 200 to be positioned, corresponding to each of the seats. In one example, the seats position information includes position information additionally configured correspondingly to the seat numbers of the seats.

In some embodiments, the information reception module 210 acquires the seats position information from the pre-issued ticket information for sports or arts performance. Alternatively, the module 210 obtains the seats position information using identification information pre-configured in the light-emitting devices 200.

In some other embodiments, the control device 100 or the information processing device 300 reads the position information of the seats from a previously issued ticket for sports or arts performance, and the read information is provided to the information reception module 210. In this case, the information reception module 210 acquires the seats position information from the control device 100 or the information processing device 300 and store the information in the storage 220.

In some other embodiments, the information reception module 210 acquires, from the group-performance presentation mapping data, the group information mapped to the seats position information to which the light-emitting devices 200 are to be positioned, in a corresponding manner to each group-performance presentation period. The module 210 configures the group mapping data according to the seats position information S210. In these embodiments, the information reception module 210 checks the group-performance presentation mapping data from the control device 100, the information processing device 300, or the database of the external server.

For example, when the group-performance presentation group-performance presentation mapping data as shown in Table 1 above has been checked from the control device 100, the information processing device 300, or the database of the external server, the information reception module 210 obtains group information (e.g., A) mapped to the seats position information of the corresponding cheering device among a plurality of groups mapped to the first presentation information, and the module 210 obtains group information (e.g., C) mapped to the seats position information of the corresponding cheering device among a plurality of groups mapped to second presentation information. Finally, the information reception module 210 configures group mapping data corresponding to each group-performance scene from the light-emitting devices 200 shown in Table 2 above.

In some embodiments, the information reception module 210 stores the group mapping data according to the seats position information into the storage 220 at S220.

According to some embodiments of the present disclosure as described above, the information reception module 210 of each of the light-emitting devices 200 performs the operations S200 to S220. However, this is only an example and the present disclosure is not limited thereto. According to some other embodiments, the operations S200 to S220 are performed by the control device 100 or the information processing device 300 to provide the group mapping data according to the seats position information to the light-emitting devices 200. For example, the control device 100 or the information processing device 300 extracts the seats position information of each of the light-emitting devices 200 from the information pre-configured in the entrance ticket or the light-emitting devices 200. Then, the control device 100 or the information processing device 300 generates the group mapping data by checking the group information mapped to the extracted seats position information from the group-performance presentation mapping data. Then, the control device 100 or the information processing device 300 provides the generated group mapping data to each of the light-emitting devices 200. Accordingly, the information reception module 210 of the light-emitting devices 200 acquires the group mapping data corresponding to the seats position information of the corresponding cheering device 200 from the control device 100 or the information processing device 300 and store the group mapping data in the storage 220.

In some embodiments, the operations of FIG. 7 as described above are performed in a ticket check process before the sports or arts performance. The audience having the above operations S200 to S220 completed carries the light-emitting device 200 having the group mapping data corresponding to the seats position information thereof, and enters the venue and occupies one of the corresponding seats. In some embodiments, the light-emitting devices 200 is used instead of the entrance tickets. In this case, the light-emitting devices 200 in place of the tickets are pre-distributed to the audiences in a state in which the operations S200 to S220 have been completed. As a result, the audiences enter the venue immediately after the ticket checking process without having to perform the operation S200 to S220 in the ticket checking process.

Figure 11:
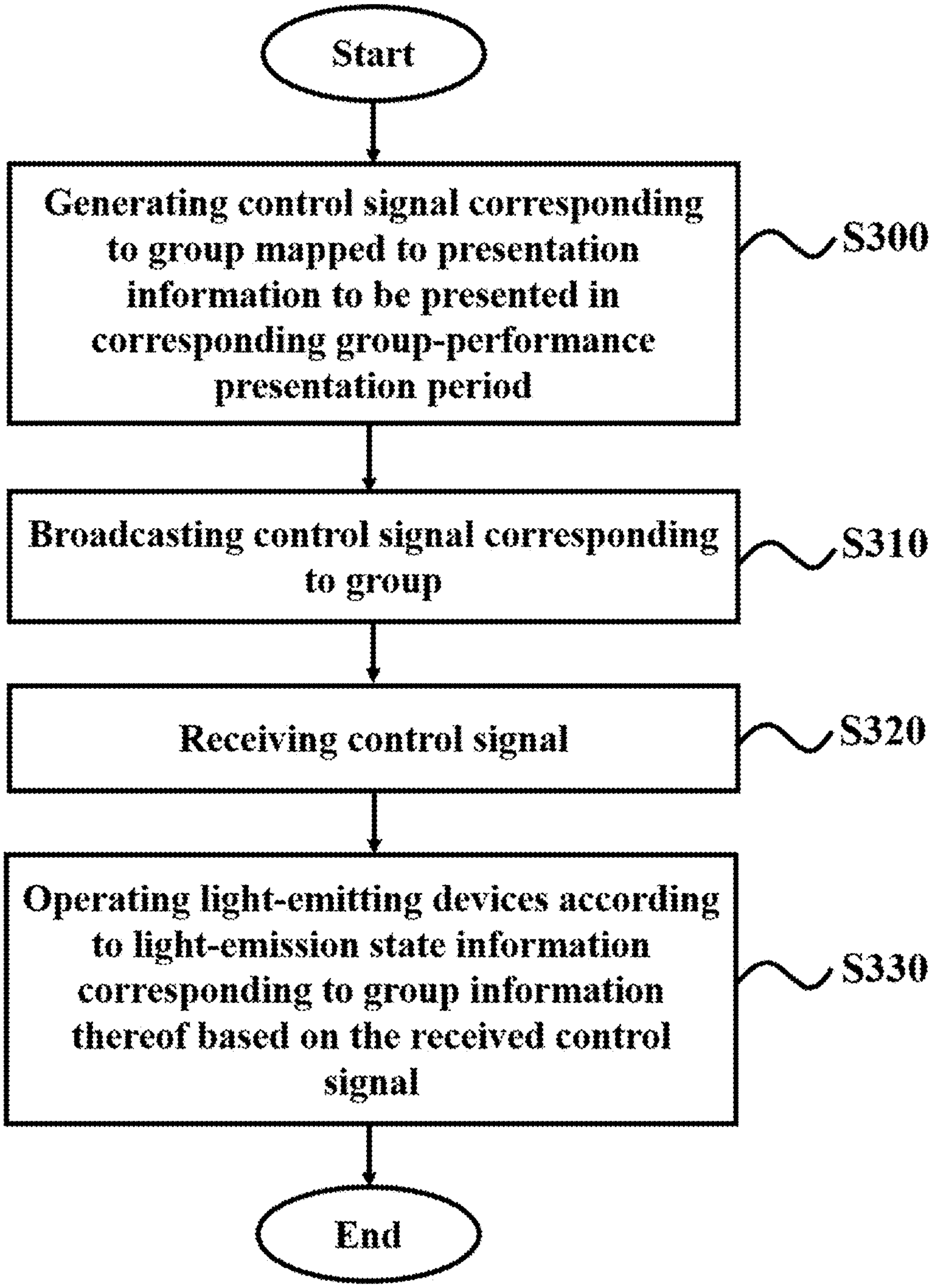
FIG. 11 is a flow chart illustrating a process for producing a group-performance in a method for controlling a group-performance according to some embodiments of the present disclosure.

FIG. 11 is a flow chart illustrating a process for producing a group-performance in a method for controlling group-performance according to some embodiments of the present disclosure. In some embodiments, the method of FIG. 11 is performed by the control device 100 and light-emitting devices 200.

One fashion of controlling group-performance in a venue according to some embodiments of the present disclosure is to divide the light-emitting devices 200 in multiple groups as described above, and to perform a process to create the group-performance presentation mapping data based on information about the group. In some embodiments, the control device 100 selectively turns on or off the plurality of light-emitting devices 200 corresponding to individual seats in the venue. In order to present an image (group-performance-scene) from the seats of the venue in a specific group-performance presentation period, some of the light-emitting devices 200 emitting the same color in the specific group-performance presentation period among all of the light-emitting devices 200 are configured into the same group. Thus, the same group identification information is allocated to the same group. In addition, the control device 100 generates the group-performance presentation mapping data mapping between the group identification information in the specific group-performance presentation period and the group light-emission color information rendered by the group of the group identification information. Further, according to some embodiments of the present disclosure, the group identification information of the group-performance presentation mapping data corresponding to the seat position information obtained beforehand by the information processing device 300 on the basis of the ticket information are recorded to the plurality of light-emitting devices 200.

Thereafter, when a performance in the venue proceeds, the control device 100 wirelessly broadcasts, into the venue, the group-performance presentation mapping data corresponding to the specific group-performance presentation period in response to a group-performance presentation sequence during the performance progress process. Then, the plurality of light-emitting devices 200 turn or off a plurality of light emission sources thereof according to the group light-emission color information corresponding to the group identification information recorded in each of the received group-performance presentation mapping data, thereby to present the image (group-performance scene) from the seats of the venue. Hereinafter, the group-performance presentation method performed during a performance proceeds is described in detail.

Referring to FIG. 11, in some embodiments, the controller 140 of the control device 100 generates a control signal corresponding to the group mapped to the presentation information presented in a corresponding group-performance presentation period (corresponding group-performance constituting scene) based on the preset group-performance presentation mapping data as the performance proceeds S300.

In some embodiments, when the group-performance presentation period is determined by a predetermined condition, the controller 140 acquires group information about a plurality of groups mapped to the corresponding group-performance presentation period determined from the group-performance presentation mapping data, and create a control signal corresponding to each group. In these embodiments, the predetermined condition is configured such that as time progresses in the performance at the venue, the group-performance presentation periods are defined based on a sequence configured in the group-performance presentation mapping data. Alternatively, the predetermined condition is configured such that the group-performance presentation periods are defined upon reception of performance presentation request signal requesting a specific group-performance presentation period (specific group-performance constituting scene) as transmitted from a user (e.g., a group-performance producer, etc.). A case where the group-performance presentation mapping data corresponding to the group-performance presentation period is created as shown in Table 1 above is considered by way of example. When the controller 140 decides to present a second group-performance constituting scene corresponding to a second group-performance presentation period as the performance progress, the controller 140 obtains three groups (e.g., A, B, C) mapped to the second group-performance scene and corresponding light-emission state information (e.g., RGB color information). The controller 140 then generates a control signal that includes the determined corresponding group-performance presentation period information (e.g., the second group-performance presentation period), information about a plurality of groups mapped thereto (e.g., three group identification information and corresponding light-emission state information of each group), etc.

Further, the controller 140 according to some embodiments generates a control signal for control of the light-emitting devices 200 in real time based on communication status, group-performance scene, and the like. In some embodiments, when a group-performance producer wants to control a group-performance scene in a specific group-performance presentation period in real time or to change a preset group-performance scene, the controller 140 generates a control signal by including control information to be controlled in a corresponding manner to a plurality of groups mapped to a specific group-performance presentation period. For example, when the group-performance scene in the specific group-performance presentation period is mapped to only the plurality of groups and light-emission state information of each group is not configured, the controller 140 configures the light-emission state information of the light-emitting devices 200 corresponding to each group according to the group-performance scene to be presented during the performance progresses to generates the control signal, which, in turn, controls the emitting devices 200. Alternatively, when the producer changes and renders the light-emission state information (e.g., RGB color information) pre-configured for each group mapped to the specific group-performance presentation period, the controller 140 is configured to modify the light-emission state information (e.g., RGB color information) for each group to configure the control signal. Thus, in some embodiments, the light-emission state information (e.g., RGB color information) of the emitting devices 200 is controlled on a group basis in a real time manner, thereby to present various group-performances.

In some embodiments, the controller 140 broadcasts the control signal corresponding to the group as generated according to the presentation information in the corresponding group-performance presentation period via the wireless communication S310.

In some embodiments, the controller 140 transmits control signals corresponding to the groups using different frequency bands. For example, the control signal for the first group is transmitted via a first frequency band, while the control signal for the second group is transmitted via a second frequency band.

In some embodiments, the controller 230 of each of the light-emitting devices 200 selectively receives the control signal from the control device 100, S320.

In some embodiments, the controller 230 checks the group information of the corresponding cheering device 200 mapped to the corresponding group-performance presentation period from the group mapping data mapped to the seats position information of the corresponding cheering device 200 stored in the storage 220. Then, the controller 230 selectively receives only the control signal corresponding to the checked group information of the corresponding cheering device 200 among the broadcasted control signals.

In some embodiments, the light-emitting unit 240 of each of the light-emitting devices 200 operates according to the light-emission state information of each of the light-emitting devices 200 corresponding to the group information thereof based on the selectively received control signal S330.

In some embodiments, the controller 230 checks the light-emission state information (e.g., RGB color information) mapped to the group information of the corresponding light-emitting device 200 from the group mapping data mapped to the seats position information of the corresponding light-emitting device 200 as stored in the storage 220. Accordingly, the light-emission from the light-emitting unit 240 is controlled by the controller 230. In some other embodiments, when the light-emission state information is included in the control signal selectively received by the controller 230, the controller 230 adjusts the light-emission from the light-emitting unit 240 for a corresponding group-performance presentation period based on the light-emission state information (e.g., RGB color information) included in the control signal.

Further, according to some embodiments of the present disclosure, the control device 100 receives a signal from the central control device (see FIG. 2) and operates in synchronization with the audio device, the illumination device, or the like within the venue. In this case, the control device 100 and the light-emitting devices 200 receive a synchronization signal from the central control device and automatically perform the operations S300 to S330 in synchronization with the audio device and illumination device in the venue.

Figure 12:
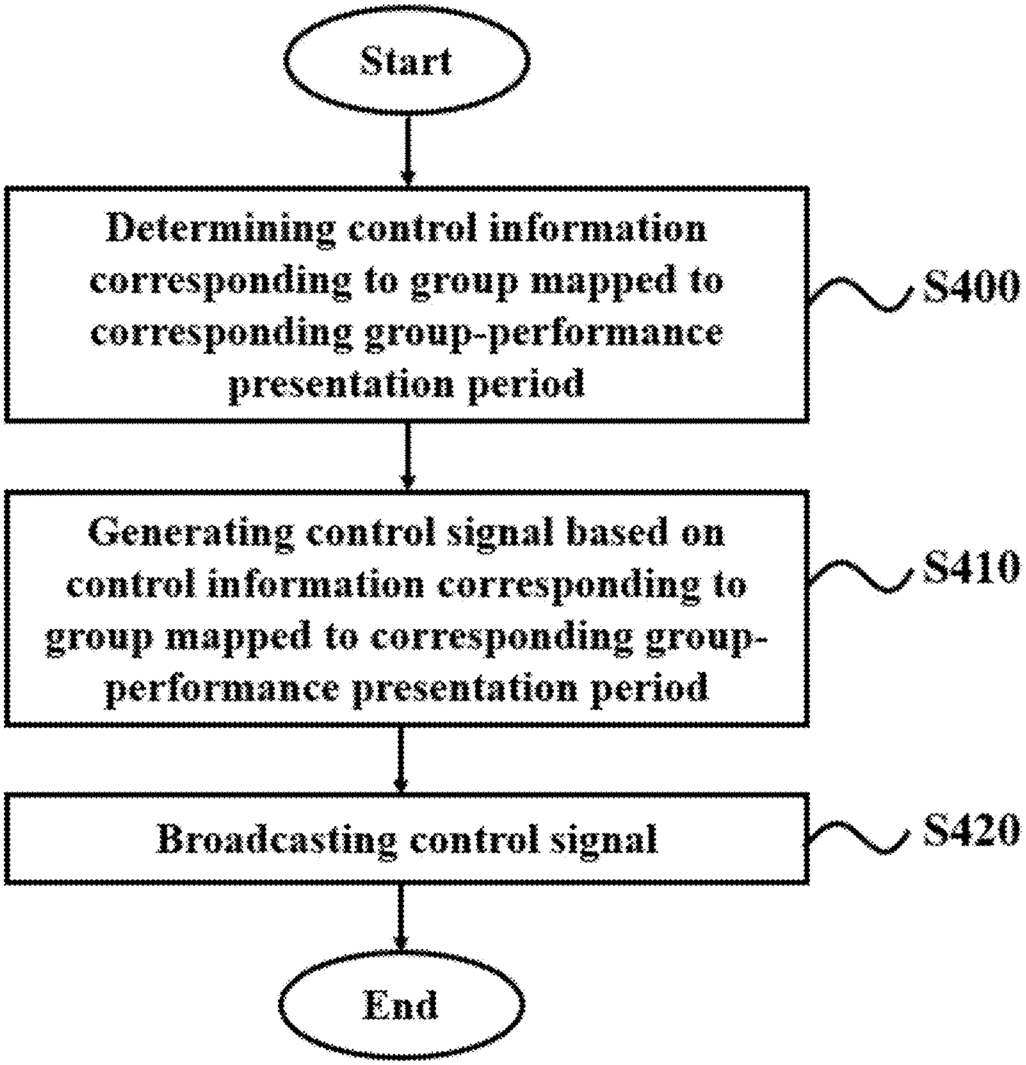
FIG. 12 is a flow chart illustrating a method of controlling a group-performance according to some embodiments of the present disclosure.

FIG. 12 is a flow chart illustrating one example of a process performed by a control device in a method for controlling group-performance according to some embodiments of the present disclosure.

Referring to FIG. 12, in some embodiments, the controller 140 of the control device 100 generates a group-based control signal in a corresponding group-performance presentation period (corresponding group-performance constituting scene) based on the group-performance presentation mapping data as the performance progresses S400.

In these embodiments, as described above, the group-performance presentation mapping data include a relationship between: a group-performance scene to be presented using the light-emitting devices 200 to be positioned in the seats of a venue as created in the group-performance presentation period during the performance progression; and the group-based control information for controlling the light-emitting devices 200 corresponding to each group corresponding to each group-performance scene corresponding to the group-performance presentation period. Further, the group-based control information includes the group information (e.g., group identification information) generated via grouping the light-emitting devices 200 to be configured to render the same light-emission state information based on each group-performance scene created corresponding to the group-performance presentation period, and the light-emission state information for each group information.

In some embodiments, the controller 140 determines a corresponding group-performance presentation period based on a sequence of the group-performance presentation periods pre-configured in the group-performance presentation mapping data. In an alternative, the controller 140 determines a corresponding group-performance presentation period based on the group-performance presentation request signal as received from the user. Once the corresponding group-performance presentation period is determined, the controller 140 of the control device 100 acquires the group-based control information mapped to the corresponding group-performance presentation period based on the group-performance presentation mapping data.

In some embodiments, the controller 140 of the control device 100 generates the control signal based on the information on the corresponding group-performance presentation period and the group-based control information in the corresponding group-performance presentation period S410.

In some embodiments, the controller 140 generates the control signal by including the light-emission state information predetermined for each group in the corresponding group-performance presentation period. Alternatively, the control signal is generated by the controller 140 configuring the light-emission state information corresponding to each group in a real time manner based on the group information mapped to the corresponding group-performance presentation period. In this case, since the light-emission state information of the light-emitting devices 200 corresponding to the group is controlled in real time, the light-emitting devices 200 present various group-performance scenes.

In some embodiments, the controller 140 of the control device 100 broadcasts the control signal to the light-emitting devices 200 within the venue via wireless communication S420.

The light-emitting devices 200 according to some embodiments of the present disclosure are mapped to the seats position information in the venue. The group control information generated in a corresponding manner to the group-performance presentation period based on the mapped seats position information is pre-stored in the storage 220. Thus, each of the light-emitting devices 200 selectively extracts the group control information (e.g., group identification information and light-emission state information of thereof from the control signal broadcasted from the controller 140. Then, each of the light-emitting devices 200 renders the light-emission state based on the extracted group control information (e.g., light-emission state information).

Further, the controller 140 of the control device 100 groups the light-emitting devices 200 based on the seats position information associated with the light-emitting devices 200, and thus generates the control information corresponding to each group. Thus, instead of individually controlling all of the light-emitting devices 200 within the venue, the light-emitting devices 200 belonging to the same group are considered as a single unit which is configured to be controlled. Thus, even in presence of thousands to tens of thousands of the light-emitting devices 200 in the venue, the controller 140 efficiently controls the light-emitting devices 200 on a group basis.

Figure 13:
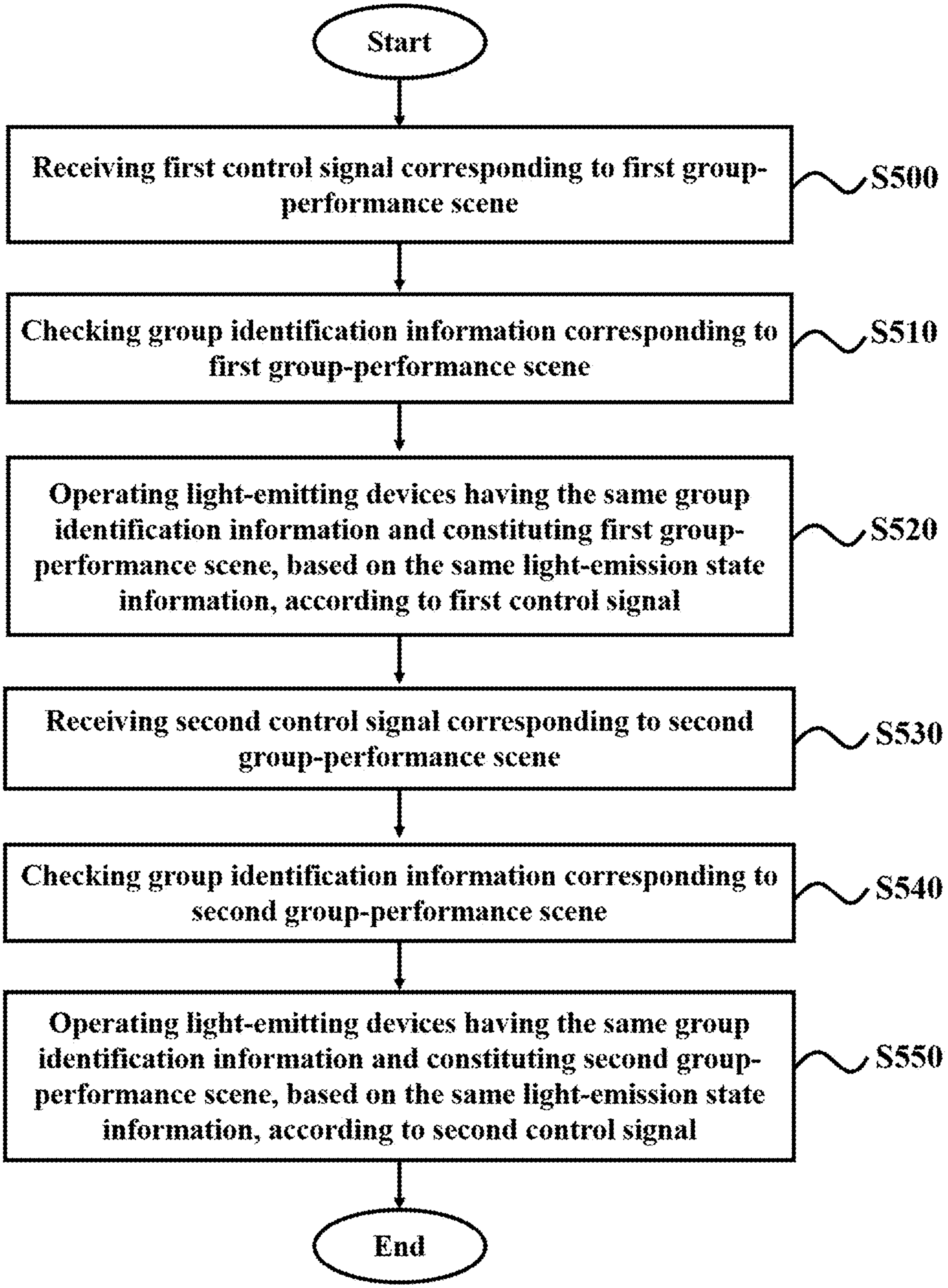
FIG. 13 is a flow chart illustrating a method for controlling a group-performance according to some embodiments of the present disclosure.

FIG. 13 is a flow chart illustrating one example of a process performed by light-emitting devices in a method of controlling group-performance according to some embodiments of the present disclosure.

Referring to FIG. 13, in some embodiments, the plurality of light-emitting devices 200 receives a first control signal transmitted from the control device 100 in order to present a first group-performance constituting scene on the corresponding seats S500.

In some embodiments, the plurality of light-emitting devices 200 checks the group identification information for the first group-performance constituting scene pre-stored in each of the plurality of light-emitting devices 200 S510.

In these embodiments, each of the plurality of light-emitting devices 200 is mapped to the seats position information in the venue. The group control information (e.g., group identification information) as generated in corresponding manner to the group-performance constituting scene based on each of the mapped position information of the seats is pre-stored. In some embodiments, the storage 220 of each of the light-emitting devices 200 stores the group mapping data including the group control information corresponding to the group-performance constituting scene as shown in Table 2 above. Thus, each of the plurality of light-emitting devices 200 obtains the group identification information thereof mapped to the first group-performance constituting scene from the group mapping data pre-stored in the storage 220.

A first A light-emitting devices group having the same group identification information for the first group-performance constituting scene among the plurality of light-emitting devices 200 renders the same light emission state (e.g., color) based on the same light-emission state information (e.g., the same light-emission color information) according to the first control signal S520.

In some embodiments, in order to present the first group-performance constituting scene, the first control signal includes pairs between the plurality of group identification information and the plurality of the light-emission state information group for the plurality of groups. Further, the first control signal includes light-emission state information about the first A light-emitting devices group and light-emission state information about a first B light-emitting devices group having group identification information different from that of the first A light-emitting devices group for the first group-performance constituting scene.

In some embodiments, the plurality of light-emitting devices 200 receives the first control signal from the control device 100. Then, the devices 200 receives the second control signal sent from the control device 100 to present, on the corresponding seats, a second group-performance constituting scene other than the first group-performance constituting scene S530.

In this case, the plurality of light-emitting devices 200 checks the group identification information in the second group-performance constituting scene stored in advance in each of the plurality of light-emitting devices 200 S540. Then, a second A light-emitting devices group having the same group identification information in the second group-performance constituting scene among the plurality of light-emitting devices 200 renders the same light-emission state (e.g., the same color) based on the same light-emission state information (e.g., the same group light-emission color information) S550.

In order to present the second group-performance constituting scene, the second control signal includes pairs between the plurality of group identification information and a plurality of light-emission state information (group light-emission color information) for the plurality of groups. Further, the plurality of light-emitting devices 200 belonging to the first A light-emitting device group and the plurality of light-emitting devices 200 belonging to the second A light-emitting device group are different from each other.

In some embodiments, the plurality of light-emitting devices 200 is turned on or off independently of one another in a corresponding manner to individual seats in the venue, thereby presenting an image (group-performance-scene) on the corresponding seats in the venue. To present the first group-performance constituting scene or the second group-performance constituting scene, the plurality of light-emitting devices 200 pre-stores only the plurality of group identification information therein among the pairs between the plurality of group identification information and the plurality of group light-emission color information, before receiving the first control signal or the second control signal.

For example, the first light-emitting device 200 among the plurality of light-emitting devices 200 acquires the corresponding group light-emission color information corresponding to the group identification information in the first control signal, based on the pre-recorded group identification information therein for the first group-performance constituting scene. Then, the first light-emitting device 200 renders the corresponding color corresponding to the obtained group light-emission color information for the first group-performance constituting scene. In these embodiments, when the second light-emitting devices group among the plurality of light-emitting devices 200 includes the same group identification information as the first light-emitting devices group, the second light-emitting devices group emits the same color as the first light-emitting devices group in the first group-performance constituting scene. On the other hand, when the second light-emitting devices group includes different group identification information than that of the first light-emitting devices group, the second light-emitting devices group emits a different color from that of the first light-emitting devices group in the first group-performance constituting scene.

Figure 14:
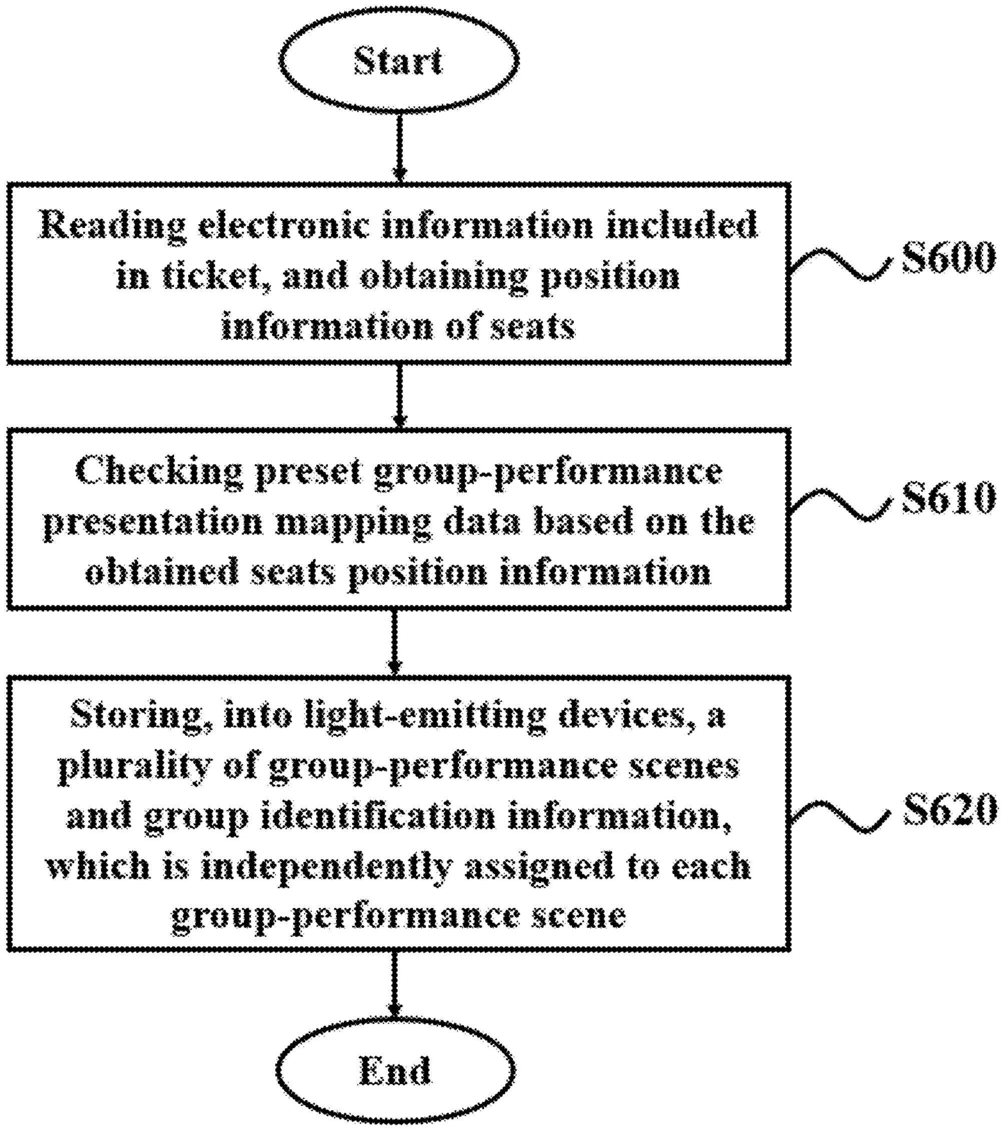
FIG. 14 is a flow chart illustrating a preliminary group-performance preparation process in a method of controlling a group-performance according to some embodiments of the present disclosure.

FIG. 14 is a flow chart showing one example of a preliminary group-performance preparation process performed by an information processing device in a method of controlling group-performance according to some embodiments of the present disclosure.

Referring to FIG. 14, in some embodiments, the information processing device 300 reads electronic information (e.g., seat information of seats) included in an entrance ticket, and then acquire position information of the seats S600. The information processing device 300 checks the group-performance presentation mapping data pre-configured for the corresponding individual seat position based on the obtained seats position information S610.

In some embodiments, the information processing device 300 records the plurality of group-performance constituting scenes, and the group identification information, as independently assigned to each of a plurality of group-performance constituting scenes based on the group-performance presentation mapping data into the first-light-emitting devices among the plurality of light-emitting devices 200 S620. In these embodiments, the group identification information is configured to group, into the same group, some of the plurality of light-emitting devices 200 rendering the same color corresponding to an image to be presented on the seats for each of the plurality of group-performance constituting scenes. That is, the group identification information of the first light-emitting devices 200 includes mapping between identification information related to the plurality of different group-performance constituting scenes, and the group to which the first light-emitting devices 200 belongs.

In some embodiments, some of the plurality of light-emitting devices 200 have the same group identification information. Further, the same group identification information is assigned to the light-emitting devices 200 that render the same light-emission state (color) corresponding to each of multiple group-performance constituting scenes. The plurality of light-emitting devices 200 having the same group identification information vary between the plurality of group-performance constituting scenes. For example, in the first group-performance constituting scene, the first group identification information is assigned to the light-emitting devices 200 that render the first light-emission state, while, the second group identification information is assigned to the light-emitting devices 200 that renders the second light-emission state. Further, the light-emitting devices 200 belonging to the first group in the first group-performance constituting scene, and the light-emitting devices 200 belonging to the first group in the second group-performance constituting scene are different from each other.

In some embodiments, the light-emitting devices 200 recording therein the plurality of group-performance constituting scenes and the group identification information independently assigned to each of the plurality of group-performance constituting scenes is distributed in a corresponding manner with the seats position information. For example, the audience having the operations S600 to S620 completed carries the light-emitting devices 200 recording therein the group identification information corresponding to each of a plurality of group-performance constituting scenes and corresponding to the seats position information of the corresponding light-emitting devices 200, and the user enters the performance venue and then occupies the corresponding seats. According to some embodiments, the light-emitting devices 200 are pre-issued and pre-distributed to the audiences in a state in which the operations S600 to S620 have been completed.

Figure 15:
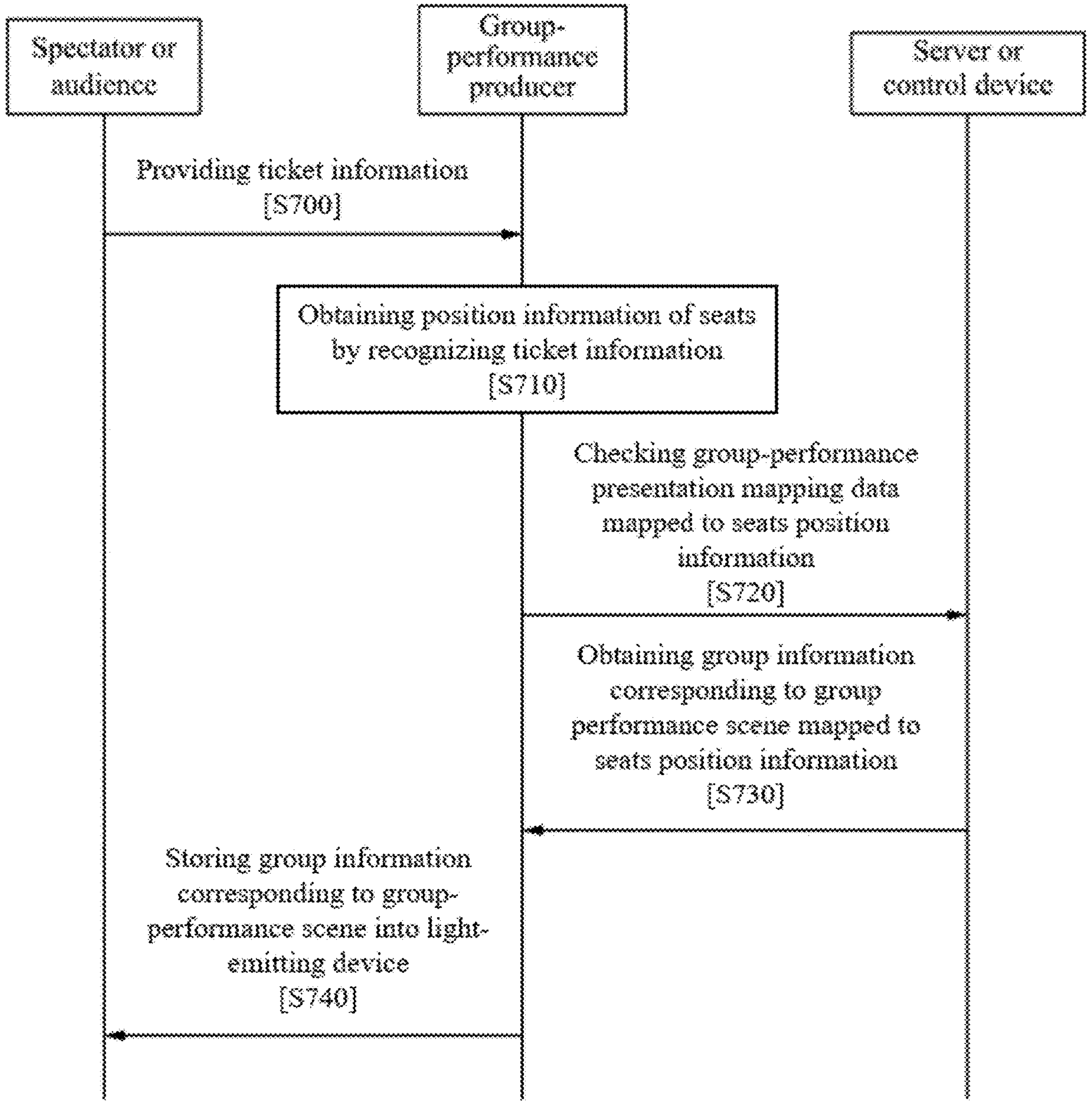
FIG. 15 is a flow chart illustrating a preliminary group-performance preparation process in a method of controlling group-performance according to some embodiments of the present disclosure.

FIG. 15 is a flow chart illustrating another example of a preliminary group-performance preparation process performed by an information processing device in a method for controlling group-performance according to some embodiments of the present disclosure.

In some embodiments of the present disclosure, spectators or audiences for viewing a specific performance carry light-emitting devices 200, which are pre-purchased or pre-distributed together with the pre-issued paper-based or electronic-based entrance ticket, and then they reach the venue. In the venue, the group-performance producer according to some embodiments provides information for the presentation of the group-performance constituting scene on the seats in the venue, to the light-emitting devices 200 owned by the spectators or audiences via the information processing device 300.

Referring to FIG. 15, each of the spectators or audiences according to some embodiments provides a pre-issued entrance ticket to the group-performance producer S700.

In some embodiments, the spectator or audience provides the group-performance producer with the ticket that includes electronic code information such as bar codes, QR codes, etc., issued via a smart device or a code printed on the paper. In these embodiments, the electronic code information is embodied as the seat information of the venue, which is the seat numbers on which the seats during the performance.

In some embodiments, the performance producer acquires the seats position information by recognizing the electronic code information included in the ticket via the information processing device 300 S710.

In some embodiments, the group-performance producer recognizes ticket information via the information acquisition module 310 of the information processing device 300, such as a device such as an optical scanner or kiosk, which recognizes electronic code information, and, thus, obtains the seats position information. In these embodiments, the seats position information refers to information corresponding to the seat numbers of the spectator or audiences to be seated in the performance or sport game. The seats position information is used as information for identifying the position of the light-emitting devices 200. In other words, the light-emitting devices 200 are mapped, in a 1:1 manner, to the seats. Thus, the seat position information is obtained from the ticket information of the spectator or audience.

In some embodiments, the group-performance producer checks, the group information corresponding to each group-performance constituting scene and mapped to the seats position information, from the group-performance presentation mapping data pre-configured based on the corresponding group-performance time table via the information processing device 300 S720.

In some embodiments, the group-performance producer accesses a database of an external server or the control device 100 that pre-stores the group-performance presentation mapping data corresponding to the corresponding group-performance time table via the information processing module 320 of the information processing device 300. Then, the group-performance producer provides the seats position information obtained from the ticket information to the database of an external server or the control device 100. Then, the group-performance producer checks the group-performance presentation mapping data corresponding to the group-performance timetable and pre-mapped to the corresponding position, based on the provided seats position information.

In some embodiments, the group performance producer acquires the group information corresponding to each group-performance constituting scene and pre-mapped to the seats position information via the information processing device 300 S730.

In some embodiments, the group-performance producer receives the group-performance constituting scene pre-mapped to the seats position information and the corresponding group information from the database or control device 100 of the external server via the information processing module 320 of the information processing device 300.

In some embodiments, the group-performance producer records the group-performance constituting scene information corresponding to the corresponding group-performance time table and pre-mapped to the seats position information and the corresponding group information, via the information processing device 300, into the light-emitting devices 200 S740.

In some embodiments, the group-performance producer tags the light-emitting devices 200 from the spectator or audiences via the information recording module 330 of the information processing device 300 including a device such an RF tag device, an NFC input device, an IR (infrared ray) device. Thus, the group-performance producer provides the light-emitting devices 200 with the group-performance constituting scene information corresponding to the group-performance time table and the group information corresponding to the group-performance constituting scene.

In some embodiments, the spectator or audience carries the light-emitting devices 200 that include the information recorded in operation S740, enters the venue, and occupies the seats corresponding to the ticket information.

FIG. 16 is an illustration of one example of a group-performance scene presented from seats according to some embodiments of the present disclosure.

In some embodiments, the control device 100 pre-configures the group-performance scene to be presented from the seats using the light-emitting devices 200 based on the position information of the seats. In these embodiments, the device 100 configures multiple group-performance scenes according to an target image to be presented during the arts performance or sports game. FIG. 16 shows an example of a single group-performance scene 500 (hereinafter, first group-performance scene) among the plurality of group-performance-scenes. The first group-performance scene 500 is configured to have a specific text 501 ("BIGBANG IS VIP") as displayed from the circularly arranged seats, and to have a specific FIG. 502 displayed from the middle region of the seats. The control device 100 groups, into a single group, the light-emitting devices 200 configured to have the same light-emission state information (e.g., color information) based on the first group-performance scene 500. In this way, the multiple groups is defined for the first group-performance scene 500. For example, each character included in the specific text "BIGBANG IS VIP" 501 corresponds to a single group. The specific shape 502 is configured to corresponding to a single group. In these embodiments, each group includes a plurality of light-emitting devices 200 positioned in the seats for representing corresponding characters or graphics. That is, the control device 100 considers the presentation pattern (e.g., color information) for the first group-performance scene 500, and the position information of the seats, and, then, groups the light-emitting devices 200 into first to n-th groups.

In some embodiments, the light-emitting devices 200 are mapped, in a 1:1 manner, to the seats in a venue. The light-emitting devices 200 pre-stores the group information corresponding to each group-performance scene based on the position information of the seats before the art performance or sports games. For example, the first light-emitting device 510 is configured to belong to the first group for the first group-performance scene 500 based on the seats position information thereof.

When the arts performance or sports games progresses, the control device 100 according to some embodiments generates a control signal based on the group information corresponding to the group-performance scene, and broadcasts the control signal via wireless communication. For example, when the present system is presenting the first group-performance scene 500 during the arts performance or sports game, the control device 100 generates and broadcasts a control signal including the light-emission state information (e.g., color information) for each of the first group to the n-th group set for the first group-performance scene 500. In these embodiments, the control device controls the light-emission state corresponding to each group in real time or change the group-performance scene dynamically with considering the mood of the group-performance venue or the presentation effect. For example, the control device 100 changes the red color pre-set for the first group to the green color in the venue in real time and sends out the control signal corresponding to the change. Thus, the control device 100 controls the light-emission state of the light-emitting devices 200 belonging to the first group. Alternatively, the control device 100 transmits the control signal having the same color information for the adjacent first and second groups, instead of the color information pre-set for each of the adjacent first and second groups. Thus, the control device 100 dynamically modifies an outline of a shape presented by the first group and the second group.

When the light-emitting devices 200 receives, from the control device 100, the control signal including the light-emission state information (e.g., color information) corresponding to each group for the first group-performance scene 500, the light-emitting devices 200 checks the group identification information for the first group-performance scene 500 pre-stored in the light-emitting devices 200 and operates according to the light-emission state information (e.g., color information) corresponding to the checked group identification information. For example, since before the performance, the group identification information is assigned to the first light-emitting device 510 to indicate that the first light-emitting device 510 belongs to the first group for the first group-performance scene 500, the first light-emitting device 510 operates based on the light-emission state information (e.g., color information upon receiving the control signal for the first group-performance scene 500 from the control device 100.

Figure 17:
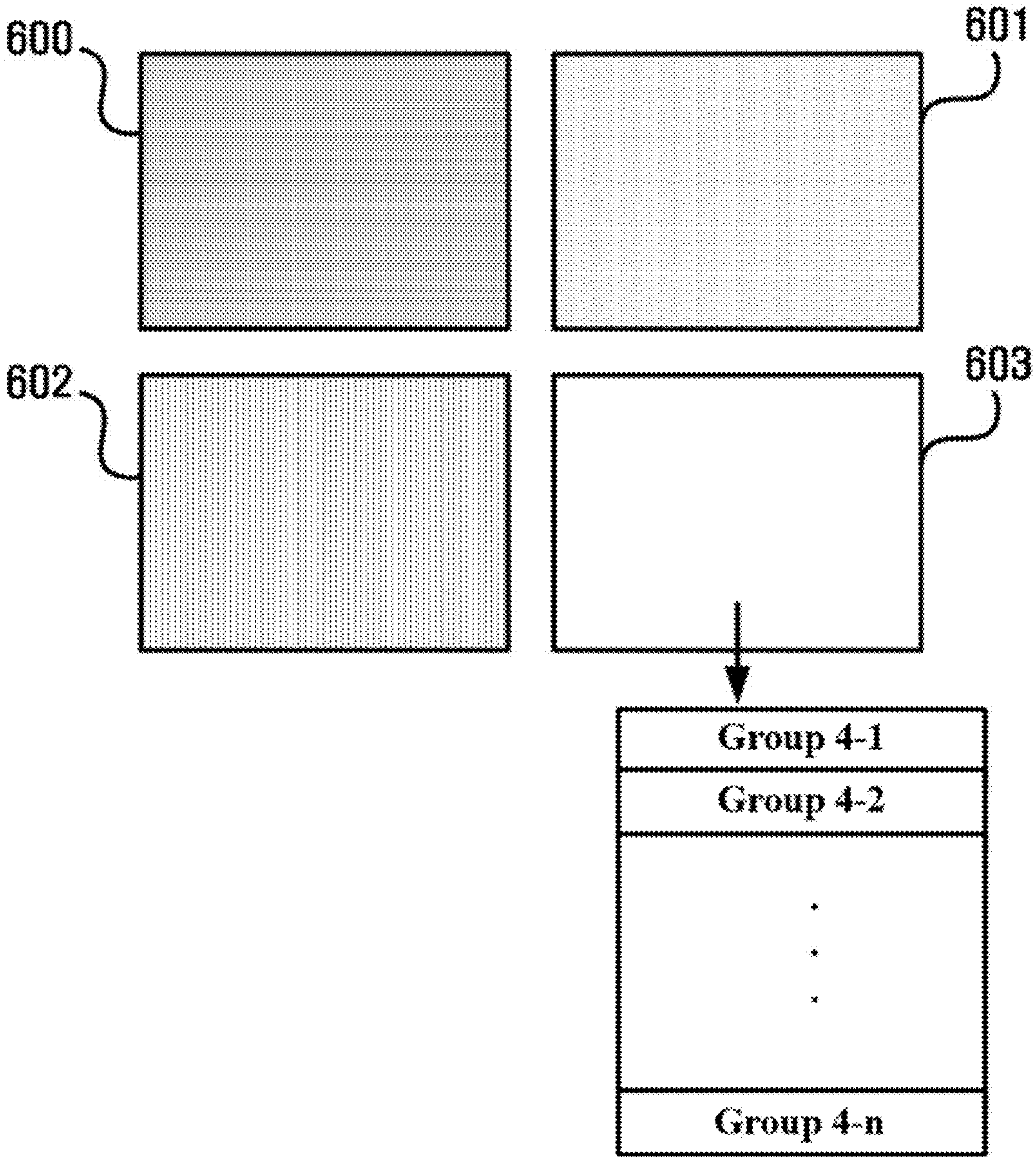
FIG. 17 is a diagram illustrating group information for a group-performance scene presented on seats according to some embodiments of the present disclosure.

FIG. 17 is a diagram illustrating group information for a group-performance scene presented in seats according to some embodiments of the present disclosure.

In some embodiments, each group-performance scene according to some embodiments of the present disclosure is grouped into a plurality of groups. Each scene group is configured to include scene group identification information and light-emission state information (e.g., color information) corresponding to the scene group identification information. For the sake of simplicity, FIG. 16 shows only some groups among the group-performance scenes grouping into a first group to n-th group. In this embodiment, the seats are grouped into a specific group based on a specific arrangement. For example, each of the first group to the fourth group 600 to 603 is configured as an M×N arrangement of the seats. In this case, the first group to fourth group 600 to 603 emit different colors. Alternatively, the first group to fourth group 600 to 603 emit the same color. Further, in some embodiments, one group is divided into subgroups. For example, the fourth group 603 includes subgroups 4-1 to 4-n. In these embodiments, each subgroup is composed of a 1×N arrangement. When such subgroups are defined, this also allows one group to display various presentations, such as gradation, surfing, sequential turning-on and off, etc.

According to some embodiments of the present disclosure as described above, each group-performance scene is presented by segmenting the seats in a specific arrangement. This allows changing or modifying the group-performance scene in real time during group-performance. Therefore, for performances in which the mood of the venue, the interaction with the audience, and the dynamic presentation effect are important, to pre-configure the presentation data from the seats via grouping using the specific arrangement is effective.

According to the present disclosure, the light-emitting devices is controlled on a group basis in the group-performance presentation in the venue. This allows using the frequency band more efficiently compared to the conventional individual control of each of the light-emitting devices. In addition, the delay time of the control signal can be reduced. Further, simultaneous control can be performed in real time via the group-based control of the light-emitting devices.

According to the present disclosure, the light-emission state of the light-emitting devices is changed and rendered in real time during the group-performance presentation in the venue. Thus, various group-performance scenes and light-emission effects are easily achieved depending on situations.

Effects of the present disclosure are not limited to the effects mentioned above. Other effects as not mentioned may be clearly understood by those skilled in the art from the descriptions below.

The operations of the method or algorithm illustrated in connection with the embodiments of the present disclosure may be embodied in hardware, in a software module executed by hardware, or embodied by a combination thereof. The software module may reside in any form of a computer-readable recording medium including a RAM (random access memory), a ROM (read only memory), an EPROM (erasable programmable ROM), an EEPROM (electrically erasable programmable ROM), a flash memory, a hard disk, a removable disk, a CD-ROM, etc. For example, each of a control device 100 shown in FIG. 1 and a light-emitting device 200 shown in FIG. 4 includes one or more processors of one or more computer systems, which are configured to perform operations of the method described above. Accordingly, the above-described methods are practical applications of physical devices.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A light emitting device for cheering, comprising:

a light emitting unit; and a control unit configured to control the light emitting unit with a color for identifying that information for a performance production scene in an audience seat of a performance hall is provided to the light emitting device, wherein the information for the performance production scene includes information on a group to which the light emitting device belongs for each of a plurality of performance production scenes, and the group to which the light emitting device belongs varies among the plurality of performance production scenes.

2. The device of claim 1, wherein the information for the performance production scene includes performance production scene information of a corresponding performance episode mapped in advance to position information of the audience seat.

3. The device of claim 1, further comprising a communication module configured to receive light emitting position information for each scene, wherein the control unit is configured to control the light emitting unit so that a color for identifying that the received light emitting position information is recorded in the light emitting device is emitted.

4. The device of claim 2, wherein the information for the performance production scene is stored in advance before the performance production, and wherein color information for each group includes information that the group to which the light emitting device belongs emits a specific color, and is provided to the light emitting device in real time during the performance production.

5. The device of claim 2, wherein the light emitting unit emits light corresponding to the performance production scene mapped to the position information of the audience seat of the light emitting device.

6. The device of claim 1, further comprising a communication module configured to receive the information for the performance production scene from an information processing device including a kiosk.

7. A method for controlling light emission performed by a light emitting device for cheering, the method comprising:

providing information for a performance production scene in an audience seat of a performance hall; and controlling the light emitting device with a color identifying that the information is provided to the light emitting device, wherein the information for the performance production scene includes information on a group to which the light emitting device belongs for each of a plurality of performance production scenes, and the group to which the light emitting device belongs varies among the plurality of performance production scenes.

8. A system for controlling light emission comprising:

a control device configured to generate and provide information for a performance production scene in an audience seat of a performance hall; and a light emitting device configured to be controlled with a color identifying that the information is provided, wherein the information for the performance production scene includes information on a group to which the light emitting device belongs for each of a plurality of performance production scenes, and the group to which the light emitting device belongs varies among the plurality of performance production scenes.

* * * * *